(12) United States Patent
Inaba et al.

(10) Patent No.: US 7,939,120 B2
(45) Date of Patent: May 10, 2011

(54) METHOD OF PREVENTING FLAVOR COMPONENT FROM DEGRADATION

(75) Inventors: Etsuko Inaba, Yokkaichi (JP); Takeshi Nakamura, Yokkaichi (JP); Masaaki Yanagi, Yokkaichi (JP)

(73) Assignee: Taiyo Kagaku Co., Ltd., Yokkaichi-Shi (JP)

( * ) Notice: Subject to any disclaimer, the term of this patent is extended or adjusted under 35 U.S.C. 154(b) by 528 days.

(21) Appl. No.: 10/535,850

(22) PCT Filed: Nov. 21, 2003

(86) PCT No.: PCT/JP03/14866
§ 371 (c)(1),
(2), (4) Date: May 20, 2005

(87) PCT Pub. No.: WO2004/045309
PCT Pub. Date: Jun. 3, 2004

(65) Prior Publication Data
US 2005/0287259 A1    Dec. 29, 2005

(30) Foreign Application Priority Data

Nov. 21, 2002 (JP) .................... 2002-337958
Nov. 21, 2002 (JP) .................... 2002-337961
Nov. 21, 2002 (JP) .................... 2002-337962

(51) Int. Cl.
*A23L 1/22*  (2006.01)
(52) U.S. Cl. ....... 426/534; 426/590; 426/541; 426/544; 426/321
(58) Field of Classification Search ............ 426/544, 426/321, 590, 541, 534, 521
See application file for complete search history.

(56) References Cited

U.S. PATENT DOCUMENTS

| | | | | |
|---|---|---|---|---|
| 5,045,337 A | * | 9/1991 | El-Nokaly et al. | 426/602 |
| 5,527,552 A | * | 6/1996 | Todd, Jr. | 426/541 |
| 5,607,707 A | * | 3/1997 | Ford et al. | 426/2 |
| 5,914,149 A | * | 6/1999 | Tomida | 426/590 |
| 6,902,756 B2 | * | 6/2005 | Vlad | 426/602 |
| 2004/0156972 A1 | | 8/2004 | Nishide et al. | |

FOREIGN PATENT DOCUMENTS

| | | | | |
|---|---|---|---|---|
| CN | 1109712 A | | | 10/1995 |
| CN | 1496683 A | | | 5/2004 |
| GB | 2297759 A | * | | 8/1996 |
| JP | 2-163197 A | | | 6/1990 |
| JP | 2163197 | * | | 6/1990 |
| JP | 4-27374 A | | | 1/1992 |
| JP | 4-36395 A | | | 2/1992 |
| JP | 6-38723 A | | | 2/1994 |
| JP | 11-209755 A | | | 8/1999 |
| JP | 2002000244 A | * | | 1/2002 |
| JP | 2002-58427 A | | | 2/2002 |

OTHER PUBLICATIONS

M.H. Stern, C.D. Robeson, L. Weisler and J.G. Baxter. 1947. "δ-Tocopherol. I. Isolation from Soybean Oil and Properties." J. Am. Chem. Soc. vol. 69. pp. 869-874.*
E. Graf. 1992. "Antioxidant Potential of Ferulic Acid." Free Radical Biology and Medicine. vol. 13. pp. 435-448.*
D.K. Hix, C.F. Kloppfenstein and C.E. Walker. 1997. "Physical and Chemical Attributes and Consumer Acceptance of Sugar-Snap Cookies Containing Naturally Occurring Antioxidants." Cereal Chemistry. vol. 74, No. 3. pp. 281-283.*

* cited by examiner

*Primary Examiner* — C. Sayala
(74) *Attorney, Agent, or Firm* — Birch, Stewart, Kolasch & Birch, LLP

(57) ABSTRACT

The present invention relates to a deterioration preventive for a flavor component, which is an oil-in-water and/or -polyhydric alcohol type emulsion, comprising an extracted tocopherol, wherein d-δ-tocopherol is contained in an amount of 45% by weight or more of a total tocopherol, ferulic acid and/or a derivative thereof, and a polyglycerol fatty acid ester; a deterioration preventive for a flavor component, which is an oil-in-water and/or -polyhydric alcohol type emulsion, comprising (A) the above-mentioned extracted tocopherol, (B) ferulic acid and/or a derivative thereof, and (C) an emulsifying agent having an HLB of 9 or more; a flavor for foodstuff, comprising the above-mentioned deterioration preventive; an emulsion flavor for foodstuff, comprising the above-mentioned extracted tocopherol, a catechin; and a polyglycerol fatty acid ester; and foodstuff comprising the above-mentioned deterioration preventive for a flavor component, the above-mentioned flavor for foodstuff, or the above-mentioned emulsion flavor for foodstuff.

11 Claims, No Drawings

METHOD OF PREVENTING FLAVOR COMPONENT FROM DEGRADATION

TECHNICAL FIELD

The present invention relates to a deterioration preventive for a flavor component (hereinafter abbreviated as deterioration preventive in some cases), a flavor for foodstuff, and foodstuff containing them.

BACKGROUND ART

In foodstuff, flavors are very important components and characterize foods; however, the flavors are components more likely to deteriorate with time by various causations during processing, distribution and storage. There are a variety of causations for deteriorating flavor components, and flavor components are likely to drastically deteriorate by the influence of heat, oxygen, light or the like in a processing step such as sterilization, and in each stage of distribution, storage, selling or the like of foodstuff, and further causing off flavor, thereby leading to a lowering of its quality. Furthermore, due to widespread in packaging of beverages in transparent or semi-transparent plastic vessels and foods in transparent bags, selling in showcases in convenience stores, and the like in recent years, chances of exposure of foodstuff to light have been dramatically increased, thereby giving more situations where the flavors are more likely to be deteriorated due to light. Especially, it has been known that citrus beverages, foodstuff containing lacto components and the like show drastic deterioration of flavors under irradiation with light. There are more likely to have situations to be influenced by heat, oxygen or the like because of selling foodstuff packaged in a vessel having a high oxygen permeability at a high temperature such as selling of foodstuff packaged in a warmed plastic vessel.

It has been known that flavors for foodstuff such as citrus flavors, coffee-based flavors, and milk-based flavors are influenced by heat, oxygen, light or the like, thereby causing deterioration with time, such as change in flavor components and generation of off flavor. Natural flavors and those similar to natural flavors especially are likely to have the tendency.

In order to solve this, various studies have been made on sterilization in a short period of time, distribution at a low temperature, development of a functional vessel having UV absorbability, addition of an antioxidant and the like. Among them, as to the addition of an antioxidant, there has been used from long ago synthetic antioxidants such as dibutylhydroxytoluene (BHT), butylhydroxyanisole (BHA), and propyl gallate. However, in recent years, there has been pointed out that these antioxidants impart an influence undesirable for physical health of human bodies, and the use of these antioxidants is avoided. In view of the above, antioxidants and deterioration preventives for flavor, which are derived from natural products substituting these synthetic antioxidants have been desired, and various proposals have been made. For example, there have been proposed a method of preventing deterioration of flavors in foodstuff utilizing chlorogenic acid, coffeic acid or the like extracted from green coffee beans [see, for example, Japanese Patent Laid-Open (JP-A) Nos. Hei 4-27374 (pages 3 to 5), Hei 6-38723 (pages 2 to 7)]; a combined use of ferulic acid and proanthocyanidin [see, for example, JP-A No. 6-38723 (pages 2 to 7)]; a method of preventing deterioration of a water-soluble flavor composition utilizing an enzyme-treated rutin [see, for example, JP-A No. 4-36395 (pages 2 to 5)] and the like. However, many of these deterioration preventives have to be used in a large amount for obtaining the effect, so that there is a disadvantage that the tastes of the deterioration preventives themselves give bad influence to the flavors of foodstuff. Especially, ferulic acid has undesirable tastes such as fermented odor, rice bran odor or astringency derived from its origin. In addition, since many of these deterioration preventives are water-soluble, there is also a disadvantage that satisfactory effects are not obtained in an emulsion flavor prepared by emulsifying or solubilizing an oily flavor, while a water-soluble flavor using ethanol as a solvent has some effects. Therefore, there is a significant limitation on its utilization in food application. In addition, as to ferulic acid, its crystallinity is also a hindrance on its utilization. Since ferulic acid added to beverages or foods forms crystals during storage, the commercial values of a product added therewith are lost, so that ferulic acid has an effect as an antioxidant but ferulic acid has not yet been actually used under current situations.

Those widely used for oxidation prevention of oily foods are dl-$\alpha$-tocopherol and extracted tocopherol. While there are numerous literatures and the like reporting oxidation prevention by tocopherol against oil using an index of POV or COV, there are few reports on deterioration prevention of a flavor component when used together with a water-soluble antioxidant, and the effect of preventing deterioration for a flavor component when used alone is actually weak under current conditions. In addition, oily antioxidants such as tocopherol are generally required to be in the form of oil-in-water or -polyhydric alcohol emulsions when used for water-based foods. However, there are also some disadvantages that emulsification thereof is unstable in water or a polyhydric alcohol, and influenced by a flavor component, a flavonoid, a catechin or the like, thereby causing separation of tocopherol, and impairing the appearance of foods, and the like. As described above, there are various processes for a flavor deterioration preventive; however, there are little means having a satisfactory effect and usefulness. Therefore, further developments have been desired.

DISCLOSURE OF INVENTION

The present invention has been accomplished in view of the above-mentioned conventional techniques, and an object thereof is to develop a deterioration preventive capable of controlling the deterioration of a flavor to a minimum level during storage of foodstuff or a flavor in foodstuff, further being excellent in dispersibility in the foodstuff and the flavor for foodstuff, without impairing its appearance and taste of foodstuff, and excellent in emulsification stability without causing any separation of an oil phase during storage. Another object of the present invention is to provide a flavor for foodstuff, and foodstuff, having hardly any influences caused by deterioration during storage of a flavor and being flavorful.

The present inventors have intensively studied in order to solve the above-mentioned problems. As a result, they have found that a deterioration preventive which is (1) a fine and stable oil-in-water and/or -polyhydric alcohol emulsion, comprising an extracted tocopherol, wherein d-$\delta$-tocopherol is contained in an amount of 45% by weight or more in a total tocopherol, ferulic acid and/or a derivative thereof, and a polyglycerol fatty acid ester; or (2) a fine and stable oil-in-water and/or -polyhydric alcohol emulsion, comprising the above-mentioned extracted tocopherol, ferulic acid and/or a derivative thereof, and an emulsifying agent, especially an emulsifying agent having an HLB of 9 or more, is excellent in tastes and capable of remarkably suppressing the change in flavor components, generation of off flavor and the like due to influences by heat, oxygen, light or the like during processing or storage of the foodstuffs or the flavors in foodstuffs.

In addition, the present inventors have found that the above-mentioned deterioration preventing effect can be further enhanced by further using a tea extract together with the above-mentioned emulsion.

Further, the present inventors have found that the same level of effects as in the case where the above-mentioned deterioration preventive is used are also obtained in an emulsion flavor for foodstuff, which is an emulsion comprising the above-mentioned extracted tocopherol, a catechin and a polyglycerol fatty acid ester.

The present invention has been perfected based on these findings, and provides (1) a deterioration preventive for a flavor component, which is an oil-in-water and/or -polyhydric alcohol emulsion, comprising an extracted tocopherol, wherein d-δ-tocopherol is contained in a ratio of 45% by weight or more in a total tocopherol, ferulic acid, and a polyglycerol fatty acid ester; and (2) a deterioration preventive for a flavor component, which is an oil-in-water and/or -polyhydric alcohol emulsion, comprising (A) an extracted tocopherol, wherein d-δ-tocopherol is contained in an amount of 45% by weight or more in a total tocopherol, (B) ferulic acid and/or a derivative thereof, and (C) an emulsifying agent having an HLB of 9 or more.

Also, the present invention provides a deterioration preventive which is further capable of remarkably suppressing the deterioration of flavor components and the generation of off flavor and sustaining the effect even in a long-term storage by using the above-mentioned emulsion together with a tea extract.

In addition, the present invention provides a flavor for foodstuff comprising the above-mentioned deterioration preventive, and an emulsion flavor for foodstuff comprising an extracted tocopherol, wherein d-δ-tocopherol is contained in an amount of 45% by weight or more in a total tocopherol, a catechin, and a polyglycerol fatty acid ester.

Even more, the present invention provides foodstuff comprising the above-mentioned deterioration preventive, the above-mentioned flavor for foodstuff, or the above-mentioned emulsion flavor for foodstuff.

BEST MODE FOR CARRYING OUT THE INVENTION

The deterioration preventive of the present invention refers to a preparation which is capable of remarkably suppressing the change in flavor components, generation of off flavor or the like due to influences of heat, oxygen, light and the like during the processing or storage of the foodstuff or flavors for foodstuff, and this preventive is not merely an antioxidant. The deterioration preventive comprises largely two embodiments as mentioned above. The deterioration preventive of the present invention will be hereinbelow explained by referring to the first embodiment as a deterioration preventive 1 and to the second embodiment as a deterioration preventive 2.

[1] Deterioration Preventive 1

The deterioration preventive 1 of the present invention is an oil-in-water and/or -polyhydric alcohol emulsion, comprising an extracted tocopherol containing d-δ-tocopherol in an amount of 45% by weight or more in a total tocopherol, ferulic acid and/or a derivative thereof, and a polyglycerol fatty acid ester.

In general, the extracted tocopherol refers to one extracted and purified from fats and oils derived from plant raw materials. The kinds of the plant raw material to be extracted are not particularly limited, and representative examples thereof include soybean oil, wheat germ oil, palm oil and the like. Among them, an extracted tocopherol derived from soybean oil contains d-δ-tocopherol in a larger amount as compared to other plants, and is suitable also from the viewpoint of industrial feeding.

In addition, the extracted tocopherol exists as a mixture of d-α, β, γ, and δ components, and a component ratio thereof is influenced by the kinds, brands, produced districts and the like of plants. Manufactured articles in which the component ratio of a specified homologue composition is increased industrially by a process such as molecular distillation are also commercially marketed.

The extracted tocopherol in the present invention is not particularly limited, and includes these general extracted tocopherols and those obtained by derivatization of the general extracted tocopherols.

In addition, the method of purifying the extracted tocopherol in the present invention is not particularly limited, and those containing d-δ-tocopherol in an amount of 45% by weight or more in a total tocopherol are essential, preferably those containing d-δ-tocopherol in an amount of 70% by weight or more are desirable, and even more preferably those containing d-δ-tocopherol in an amount of 85% by weight or more are desirable. Among the homologues of the extracted tocopherol, d-δ-tocopherol especially has an effect of suppressing flavor deterioration, and the higher the ratio of d-δ-tocopherol in a total tocopherol, the more effective. It is preferable that d-δ-tocopherol is contained in an amount of 45% by weight or more in a total tocopherol, because the effect of suppressing flavor deterioration is satisfactory and off flavor is not generated.

The d-δ-tocopherol in the present invention includes not only d-δ-tocopherol but also a derivative thereof. For example, an acetic ester of d-δ-tocopherol obtained by esterification of d-δ-tocopherol with acetic acid is more preferable because stability is improved and sustained suppressing effects of flavor deterioration is expected.

The determination of the content of each of the homologues of the extracted tocopherol can be performed by a determination method (high-performance liquid chromatograph method) as described in the Japan's Specifications and Standards for Food Additives.

The content of the extracted tocopherol in the deterioration preventive of the present invention is not particularly limited. The content is preferably from 0.001 to 50% by weight. Even more preferably, it is desired that the content is from 0.01 to 10% by weight. It is preferable that the content is 0.001% by weight or more, because an expected effect is satisfactorily obtained, and that the content is 50% by weight or less, because an excellent emulsification stability is obtained.

Ferulic acid used in the present invention is represented by the following structural formula, and distributed widely in various organs in almost all plants.

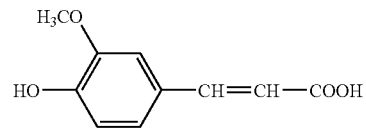

Its origin is not particularly limited, and includes naturally derived substances such as *Syzygium aromaticum, Zea mays* L., coffee bean, *Hordeum vulgare, Triticum aestivum*, rice, and rubber resin, and additionally, chemically synthesized compounds may also be used. Ferulic acid includes one obtained by culturing a bacterium (*Pseudomonas*) in a culture medium containing oil from *Syzygium aromaticum* obtained by distillation with water vapor from buds and leaves of Myrtaceae *Syzygium aromaticum* or eugenol obtained by purification from oil from *Syzygium aromaticum*, and separating and purifying the culture medium, one obtained by distributing a rice bran oil with a water-containing ethanol and hexane under weakly alkaline conditions at room temperature, thereafter hydrolyzing γ-oryzanol obtained in the water-containing ethanol with sulfuric acid under pressure and heat, and purifying the hydrolysate, and the like. Ferulic acid and a derivative thereof may be a purified product or un-purified product. Since the antioxidation ability depends upon its purify, it is desirable to use a purified product having a ferulic acid content of 80% by weight or more, preferably 95% by weight or more.

Ferulic acid derivatives include those obtained by derivatization of ferulic acid utilizing reactive functional groups on ferulic acid, specifically a hydroxyl group and a carboxyl group. The derivative includes, for example, salts, esters, amide compounds and the like of ferulic acid.

The amount of the ferulic acid or a derivative thereof in the deterioration preventive of the present invention is not particularly limited. The amount is preferably from 0.005 to 10% by weight. Even more preferably, it is desired that the amount is from 0.01 to 5% by weight. It is preferable that the amount is 0.005% by weight or more, because an expected effect is satisfactorily obtained, and on the other hand that the amount is 10% by weight or less, because excellent stability of a deterioration preventive is obtained.

As the deterioration preventive of the present invention, those containing a tea extract are preferable because the effect for preventing deterioration of a flavor component is high. The raw material of a tea extract usable in the present invention is not particularly limited. The raw material includes green tea leaves which are non-fermented tea leaves, oolong tea leaves which are semi-fermented tea leaves, and black tea leaves which are fermented tea leaves, each being produced from leaves of *Camellia Sinensis* botanically a plant belonging to Theaceae. Among them, green tea leaves which are non-fermented tea leaves may be preferably used. The extract includes a fraction obtained by extracting tea leaves or ground tea leaves with water, boiling water or an alcohol such as glycerol or ethanol, or one obtained from an ethyl acetate-soluble fraction, acetone-soluble fraction, or the like, and even more preferably includes at least one catechin selected from the group consisting of (+)-catechin, (−)-epicatechin, (+)-gallocatechin, (−)-epigallocatechin, (−)-catechin gallate, (−)-epicatechin gallate, (−)-gallocatechin gallate and (−)-epigallocatechin gallate. The content of the above-mentioned catechin is not particularly limited. It is preferable that the above-mentioned catechin is contained in an amount of 60% by weight or more in a tea extract used, and even more preferably contained in an amount of 70% by weight or more.

The total content of these catechins can be determined by a colorimetric method using iron tartrate. In order to determine the components of each catechin, the determination by high-performance liquid chromatography is preferable.

The content of the tea extract in the deterioration preventive of the present invention is not particularly limited. The content is preferably from 0.005 to 20% by weight. Even more preferably, it is desired that the content is from 0.1 to 10% by weight. It is preferable that the content is 0.005% by weight or more, because a satisfactory effect is obtained, and on the other hand that the content is 20% by weight or less, excellent usability is preferably exhibited without influencing the taste of the food by the flavor in the deterioration preventive. Here, the content of the catechin is preferably within the range of the content of the catechin in [2] Flavor 2 described later.

The polyglycerol fatty acid ester usable in the present invention is not particularly limited. The compositional distribution of the polyglycerol used as its raw material significantly affects the emulsion particle size described later. Preferably, it is desirable that the content of at least one polyglycerol fatty acid ester selected from the group consisting of polyglycerol fatty acid esters of which degrees of condensation of glycerol condensation are tri, tetra, penta, hexa, hepta, octa, nona and deca is 35% by weight or more in the composition of the polyglycerol fatty acid ester, and more preferably, the content may be 45% by weight or more. Also, the degree of polymerization of glycerol is preferably tri (3) or more, more preferably tetra (4) or more, and even more preferably penta (5) or more.

An emulsion containing an extracted tocopherol in an oil phase and further containing a flavonoid, a catechin or the like has some problems that emulsification stability is generally poor, and that separation of an oil phase takes place. The polyglycerol fatty acid ester described above is effective for emulsification. A polyglycerol fatty acid ester of which content of one kind of ester having a degree of condensation of glycerol of tri (3) or more is 35% by weight or more in the polyglycerol composition is especially excellent in emulsification stability and capable of being solubilized. Therefore, its application range can be widened. For example, application to a transparent beverage or the like is also preferable. Even more preferably, a polyglycerol fatty acid ester of which content of one kind of ester having a degree of condensation of glycerol of penta (5) or more is 35% by weight or more in the polyglycerol composition is advantageous.

The determination of the distribution of the degree of polymerization of the polyglycerol is not particularly limited. A polyglycerol fatty acid ester is hydrolyzed, and the resulting polyglycerol moiety is then analyzed by gas chromatography or liquid chromatography; for example, a polyglycerol is trimethylsilylated or acetylated to give a polyglycerol derivative, the derivative can be then subjected to separation and quantification by gas chromatography, and the distribution of the degree of polymerization is obtained according to an area normalization method.

The content of the polyglycerol fatty acid ester in the deterioration preventive 1 of this embodiment is not particularly limited, and the content is preferably from 0.1 to 30% by weight, and more preferably from 0.5 to 10% by weight.

A constituting fatty acid of a polyglycerol fatty acid ester usable in the present invention is, for example, a linear, saturated or unsaturated fatty acid having 8 to 22 carbon atoms, which may be used alone or in admixture. In addition, the emulsifying agent usable for emulsification of the deterioration preventive is not limited to the polyglycerol fatty acid ester alone, and one or more kinds of other emulsifying agents may be used together. The emulsifying agents as mentioned above are exemplified by monoglycerol fatty acid esters, organic acid monoglycerides, monoglyceride derivatives, propylene glycol fatty acid esters, sorbitan fatty acid esters, sucrose fatty acid esters, enzymatically treated lecithin, quillaia extract, polyoxyethylene derivatives and the like.

The polyhydric alcohol usable in the present invention is a generic term for a compound having two or more hydroxyl groups in one molecule, and its kinds are not particularly limited. The polyhydric alcohol includes, for example, glycerol, propylene glycol, sorbitol, maltitol, xylitol, erythritol, lactitol, sorbitan, xylose, arabinose, mannose, trehalose, lactose, sugar, coupling sugar, glucose, enzyme-saccharified syrup, acid saccharified syrup, maltose syrup, maltose, isomerized sugar, fructose, hydrogenated maltose, hydrogenated starch hydrolysate, honey and the like. Preferably, the polyhydric alcohol includes glycerol, propylene glycol, sorbitol, hydrogenated starch hydrolysate and the like. These can be used alone or in admixture of two or more kinds. Alternatively, the polyhydric alcohol may be used in the form of an aqueous solution. For the purpose of lowering the viscosity of a deterioration preventive and providing easiness in utility, water, ethanol and the like may be mixed within the range so as not to influence the emulsification. Further, in order to improve the added values, functional substances such as colorants, vitamins, highly unsaturated fatty acids and the like may be formulated.

The content of a polyhydric alcohol in the deterioration preventive 1 of this embodiment is not particularly limited. It is preferably from 50 to 99% by weight, more preferably from 70 to 99% by weight.

The usable water is not particularly limited. Water includes tap water, distilled water, ion-exchanged water, ultrapure water and the like. Water constitutes the balance when the amount of the deterioration preventive is defined as 100% by weight.

The deterioration preventive of the oil-in water and/or -polyhydric alcohol type of the present invention is obtained by dissolving a polyglycerol fatty acid ester or an emulsifying agent containing as an essential component a polyglycerol fatty acid ester in water and/or polyhydric alcohol, thereafter adding an oil phase containing an extracted tocopherol, and emulsifying the mixture with an emulsification apparatus. The emulsification apparatus is not particularly limited, and specific examples thereof include a homomixer, a colloid mill, a high-pressure homogenizer, an ultra-high pressure homogenizer, a vacuum emulsification apparatus and the like. The method of adding ferulic acid or a derivative thereof is not particularly limited, and the addition may be carried out before or after the emulsification, and it is desirable that the ferulic acid or a derivative thereof is preferably added before emulsification to be well dissolved in water and/or the polyhydric alcohol. The method of adding a tea extract is not particularly limited, and the addition may be carried out before or after the emulsification, and it is desirable that a tea extract is preferably added simultaneously with ferulic acid or a derivative thereof, to be well dissolved in water and/or polyhydric alcohol, also from the viewpoint of simplicity in the production. For the purpose of preventing the deterioration of raw materials and improving the stability of a preparation, it is desirable to carry out preparation under a gas stream of an inert gas such as nitrogen or helium throughout the entire process.

The deterioration preventive of oil-in water and/or -polyhydric alcohol type in the present invention is preferably formed into fine emulsion particles having an average particle size of 1.0 μm or less using a polyglycerol fatty acid ester. By the preparation as described above, tocopherol which is an oily antioxidant is not separated and crystallization of ferulic acid or a derivative thereof which is hardly water-soluble is suppressed to improve the dispersibility, whereby the deterioration of flavors can be effectively prevented without impairing the appearance of the foodstuff. It is desirable that the average particle size is preferably 0.6 μm or less, more preferably 0.4 μm or less, even more preferably 0.2 μm or less. By finely emulsifying the particles to a size of 0.4 μm or less, emulsification stability is even more excellent. In the case where the particles are emulsified to a size of 0.2 μm or less, the particles are solubilized, so that the emulsion can be used for transparent beverages and the like. In addition, the smaller the average particle size, the larger the contact surface area of a deterioration preventive with a flavor component in the foodstuff, so that the effect of preventing deterioration increases and the effect can be satisfactorily exhibited with the addition in a small amount.

The average particle size when the deterioration preventive in the present invention is dispersed in water can be easily measured using a particle size distribution analyzer such as (L-230) manufactured by Beckman Coulter, Inc. and the like.

In the deterioration preventive of the present invention, the deterioration of the flavor components is as a matter of course prevented by containing an extracted tocopherol, ferulic acid or a derivative thereof, and a polyglycerol fatty acid ester to give a fine and stable emulsion. By using ferulic acid or a derivative thereof in the deterioration preventive of the present invention, undesirable flavors such as fermentation odor, rice bran odor and astringency derived from the origin of ferulic acid are suppressed to give mild taste. Therefore, the utilization range to the foodstuff which had been difficult with ferulic acid alone can be widened.

In addition, by further using a tea extract together with an emulsion containing an extracted tocopherol, ferulic acid or a derivative thereof, and a polyglycerol fatty acid ester, the above-mentioned effects on ferulic acid or a derivative thereof can be enhanced, and further the effect of preventing deterioration of flavor components by heat, oxygen, light or the like and the effect of suppressing offensive odor and off flavor component occurring during the long-term storage can be remarkably improved.

The deterioration preventive of the present invention can give the desired effects by using an oil-in-water and/or -polyhydric alcohol emulsion, containing an extracted tocopherol, wherein d-δ-tocopherol is contained in an amount of 45% by weight or more in a total tocopherol, ferulic acid and/or a derivative thereof, and a polyglycerol fatty acid ester, or alternatively, further using the emulsion together with a tea extract. A known antioxidant may be also used together as desired. Examples thereof include oil-soluble antioxidants (licorice oil extract, unsaponified product of sesame oil, γ-orizanol, rapeseed oil extract, L-ascorbic acid ester), water-soluble antioxidants (L-ascorbic acid, sodium L-ascorbate, erythorbic acid, sodium erythorbate, gallic acid, chlorogenic acid, enzyme-treated rutin, grape seed extract, rosemary extract, sunflower extract, quercetin, myrica extract, edible canna extract, blueberry leaf extract and the like), hardly antioxidants hardly soluble in water and oil (extract from *Houttuynia cordata*, flower extract from plants of Malvaceae, Pimenta extract and the like), metal capturing agents (gluconic acid, kojic acid, phytic acid, polyphosphoric acid, chitin, chitosan and the like), amino acids, organic acids such as citric acid or salts thereof, hesperidin, hesperetin and the like, one or more of these may be formulated together.

[2] Deterioration Preventive 2

The deterioration preventive 2 of the present invention is an oil-in-water and/or -polyhydric alcohol emulsion, comprising (A) an extracted tocopherol, wherein d-δ-tocopherol is contained in an amount of 45% by weight or more of the total tocopherol, (B) ferulic acid and/or a derivative thereof, and (C) an emulsifying agent having an HLB of 9 or more.

The preferred embodiments of the extracted tocopherol, the ferulic acid and a derivative thereof, water, the polyhydric alcohol, the tea extract, other components and the like, and the contents thereof are all the same as those of the above-mentioned deterioration preventive 1.

The emulsifying agent usable in the present invention is a generic term for a compound having a hydrophilic group and a lipophilic group in the same molecule, and it is desirable that the emulsifying agent is hydrophilic. The degree of hydrophilicity and lipophilicity of the emulsifying agent is expressed by HLB (Hydrophilic Lipophilic Balance). In order to obtain the object of the present invention, it is desirable that the HLB is 9 or more, preferably 12 or more, even more preferably 14 or more. When the HLB is smaller than 9, the antioxidant component cannot be finely dispersed in water and the deterioration preventing effect is poor. The method for determining an HLB is not particularly limited, and known various means can be utilized. For example, in the case of an emulsifying agent in the ester form, the HLB can be calculated from the saponification value and the acid value of the constituting fatty acid according to the following formula.

$$HLB = 20 \times (1 - S/A)$$

wherein S: saponification value and

A: acid value of the constituting fatty acid

The HLB of one only having a polyoxyethylene chain as a hydrophilic group can be calculated according to the following formula.

$$HLB = E/5$$

wherein E: weight percentage of the polyoxyethylene group

Besides these arithmetic methods, the HLB can be also determined experimentally. Specifically, an emulsifying agent having a known HLB and an emulsifying agent having unknown HLB are combined to emulsify the fat or oil having a known HLB and water, one having a mixing ratio giving the best emulsification state is selected, and the HLB can be calculated according to the following formula.

$$\{(Wu \times HLBu) + (Wa \times HLBa)\} / \{Wu + Wa\} = HLBo$$

wherein Wu: weight percentage of the emulsifying agent having unknown HLB

Wa: weight fraction of emulsifying agent having a known HLB

HLBu: HLB of the emulsifying agent having an unknown HLB (HLB of emulsifying agent to be obtained)

HLBa: HLB of the emulsifying agent having a known HLB

HLBo: desired HLB of the fat or oil

General emulsifying agents having an HLB of 9 or more include synthetic emulsifying agents such as polyglycerol fatty acid esters, sucrose fatty acid esters, sodium stearoyllactate, calcium stearoyllactate, polyoxyethylene derivatives and salts of fatty acids; and derivatives of lecithin obtained by chemical or enzymatic treatment of naturally derived lecithins such as enzymatically degraded lecithin, hydrogenated enzymatically degraded lecithin, hydroxylecithin, phosphatidyl glycerol, phosphatidic acid, and acetylated lecithin; naturally derived saponins such as soyasaponin, and quillaia saponin; and the like. As the origin of lecithin, those derived from plants such as soybean, rice, rapeseed, and safflower, and those derived from animals such as egg yolk and the brain can be utilized.

Usually, emulsifying agents commercially marketed are in the form of mixtures containing various molecular species, and components having a function necessary for achieving the object are contained in only slight amount. Therefore, the emulsifying agent has to be used in an unnecessarily large amount, thereby conversely leading to instability of the preparation. Even under the above situations, since the sucrose fatty acid ester having a relatively narrow distribution of molecular species and containing molecule species suitable for attaining the object in large amounts is obtained, the sucrose fatty acid ester is especially preferably utilized.

In addition, the polyoxyethylene derivative can serve to incorporate an oily substance in its polyoxyethylene chain, thereby exhibiting an effect excellent of giving finer emulsion particles. Therefore, the polyoxyethylene derivative can be also preferably utilized in the present invention in the same manner as that of the sucrose fatty acid ester.

The sucrose fatty acid ester of the present invention is a compound having a structure in which a fatty acid having a lipophilic group is bonded to sucrose having a hydrophilic group. The constituting fatty acid of the sucrose fatty acid ester is a linear or branched, saturated or unsaturated fatty acid having 8 to 22 carbon atoms, which may be used alone or in admixture. The degree of esterification is not particularly limited, and one having a low degree of esterification and having a high monoester content may be preferable. Preferably, one having a monoester content of 85% by weight or more is desirable, even more preferably, one having a monoester content of 90% by weight or more is preferable. When the monoester content is 85% by weight or more, it is preferable because precipitation or turbidity does not occur in a long-term storage when used in a transparent beverage or acidic foodstuff.

The polyoxyethylene derivative of the present invention refers to an emulsifying agent comprising a lipophilic group having a linear or branched, saturated or unsaturated alkyl group, and a hydrophilic group having a polyoxyethylene chain or a partial structure of a polyoxyethylene chain. The compound encompassed herein includes polyoxyethylene alkyl ethers, polyoxyethylene alkylphenyl ethers, polyethylene glycol fatty acid esters, polyoxyethylene sorbitan fatty acid esters and the like. Among them, the polyoxyethylene sorbitan fatty acids can be preferably utilized because of their high safety. The polyoxyethylene sorbitan fatty acids having different properties can be prepared by changing the kinds of constituting fatty acids, the number of moles added and polyoxyethylene chain length, and their kinds are not particularly limited. One having an HLB of 9 or more includes emulsifying agents such as Polysorbate 65, Polysorbate 80, Polysorbate 60, Polysorbate 40 and Polysorbate 20.

In addition, the emulsifying agent usable for emulsification of the deterioration preventive is not limited to the sucrose fatty acid ester or the polyoxyethylene derivative alone, and these emulsifying agents may be used together, or one or more of other emulsifying agents may be further used together. The emulsifying agents as described above can be exemplified by monoglycerol fatty acid esters, polyglycerol fatty acid esters, organic acid monoglycerides, monoglyceride derivatives, propylene glycol fatty acid esters, sorbitan fatty acid esters, enzymatically degraded lecithin, quillaia extract and the like.

The content of the emulsifying agent having an HLB of 9 or more in the deterioration preventive 2 of this embodiment is not particularly limited. The content is preferably from 0.1 to 30% by weight, more preferably from 0.5 to 10% by weight.

The deterioration preventive 2 of this embodiment can be prepared in the same manner as in the deterioration preventive 1, using any of the above-mentioned emulsifying agents having an HLB of 9 or more in place of the polyglycerol fatty acid ester or the emulsifying agent containing as an essential component the polyglycerol fatty acid ester, in the process for preparing the above-mentioned deterioration preventive 1. Preferred embodiments of the average particle size of emulsion particles and determination methods thereof are also the same. By preparing the deterioration preventive 2 in the manner as described above, the same effect as that described in the deterioration preventive 1 can be obtained. Further, the effect can be improved by using a tea extract together. In addition, a known antioxidant as described above may also be used together therewith as desired.

Subsequently, the flavor for foodstuff of the present invention will be explained. The flavor comprises largely two embodiments. Regarding the flavor for foodstuff of the present invention, the first embodiment will be explained as a flavor 1 and the second embodiment as a flavor 2 hereinbelow.

[1] Flavor 1

The flavor 1 is a flavor for foodstuff comprising the above-mentioned deterioration preventive. The flavor component for foodstuff usable in the present invention is not particularly limited. The flavor component includes, for example, one comprising one or a mixture of two or more kinds selected from, for example, natural flavor materials such as essential oil, essential oil extract, oleoresin, recovered flavor, and isolated flavors; and synthetic flavor materials such as alcohols, esters, aldehydes, ketones, and lactones; and their forms include flavoring agents such as oil-soluble flavors, water-soluble flavors, emulsion flavors, and powder flavors. The oil-soluble flavor component and the water-soluble flavor component can be used alone or together. The oil-soluble flavor component refers to a component insoluble in water.

The method of mixing the deterioration preventive of the present invention and these flavor components is not particularly limited. In order to effectively suppress the deterioration of flavor components, it is preferable that the oil-soluble flavor component is previously mixed with an extracted tocopherol before the emulsification of the deterioration preventive, and that the water-soluble flavor component is mixed after the emulsification.

The mixing ratio of the deterioration preventive of the present invention and these flavor components is not particularly limited. Although the mixing ratio cannot be flatly determined since the mixing ratio varies depending upon the composition of flavor components in the flavor for foodstuff, the kinds of foodstuff used, and the like. Generally, it is preferable that the components are mixed so that the flavor components:the deterioration preventive (weight ratio) is within the range of from 99:1 to 1:99.

[2] Flavor 2

The flavor 2 is an emulsion flavor for foodstuff, comprising an extracted tocopherol, wherein d-δ-tocopherol is contained in an amount of 45% by weight or more of the total tocopherol, a catechin and a polyglycerol fatty acid ester.

The extracted tocopherol, the polyglycerol fatty acid ester, other components and the like, and preferable embodiments thereof used in the flavor 2 are all the same as in the case of the above-mentioned deterioration preventive 1.

The content of the extracted tocopherol in the flavor 2 is not particularly limited. The content of from 0.01 to 10% by weight is preferable from the viewpoint of the emulsification stability of the flavor. Even more preferably, the content of from 0.1 to 5% by weight is desirable.

In the flavor 2, any of the oil-soluble flavor component and the water-soluble flavor component can be used without limitation in the same manner as in the above-mentioned flavor 1. The oil-soluble flavor component and the water-soluble flavor component can be used alone or in admixture of two or more kinds. As the flavor component, oil-soluble flavor components are preferable. The oil-soluble flavor component is not particularly limited. Specific examples thereof include citrus-based essential oils such as lemon essential oil, and orange essential oil, and coffee oil, butter oil and the like. In addition, any of the oil-soluble flavor components and the water-soluble flavor components are not limited to their derivations from natural or synthetic products. The method of adding flavor components is not particularly limited, and it is preferable that the oil-soluble flavor component is previously mixed with an extracted tocopherol before the emulsification, and that the water-soluble flavor component is mixed after the emulsification.

The catechin usable as the flavor 2 may be one containing at least one member selected from (+)-catechin, (−)-epicatechin, (+)-gallocatechin, (−)-epigallocatechin, (−)-catechin gallate, (−)-epicatechin gallate, (−)-gallocatechin gallate and (−)-epigallocatechin gallate, and the kinds of the raw material plants are not particularly limited. Representative examples thereof include tealeaves, avocado fruit skins, cacao beans, apples and the like. Among them, tea catechin obtained from a tealeaf raw material richly contain a catechin in tealeaves, and is preferable from the viewpoint of industrial feeding. The catechin can be used in the form of a plant extract, and the extract can be prepared, for example, in the same manner as for a tealeaf extract used in the above-mentioned deterioration preventive 1. The content of the catechin in the extract is not particularly limited. For example, it is desired that the catechin is contained in an amount of preferably 60% by weight or more in the extract, and even more preferably, the catechin is contained in an amount of 70% by weight or more.

The content of the catechin in the flavor 2 is not particularly limited. It is desired that the content of from 0.01 to 10% by weight is more preferable from the viewpoint of the emulsification stability of the emulsion flavor, and even more preferably the content of from 0.1 to 5% by weight.

The content of the polyglycerol fatty acid ester in the flavor 2 of this embodiment is not particularly limited. The content is preferably from 0.1 to 30% by weight, more preferably from 0.5 to 10% by weight.

The method of preparing the flavor 2 of this embodiment is not particularly limited. For example, preferable is a method comprising dissolving a polyglycerol fatty acid ester or an emulsifier containing as an essential component a polyglycerol fatty acid ester in a polyhydric alcohol, adding an oil phase containing an extracted tocopherol thereto, and emulsifying the mixture with an emulsification apparatus. The emulsification apparatus is not particularly limited, and includes various apparatuses as mentioned above. The addition of the catechin may be before or after the emulsification. When added after the emulsification, it may be preferable that a solution prepared by previously dissolving the catechin in the polyhydric alcohol or the like is added. In the flavor 2 of the present invention, a known antioxidant, a metal capturing agent or the like as described in the above-mentioned deterioration preventive 1 can also be formulated.

Subsequently, the foodstuff of the present invention will be explained.

[1] Foodstuff

The foodstuff of the present invention are foodstuff comprising the above-mentioned deterioration preventive or the above-mentioned flavor.

In the present invention, the foodstuff are not particularly limited, and the effects are exhibited in all the food in which the flavor component is deteriorated by the influence of heat, oxygen or light. The foodstuff include, for instance, beverages such as beverages containing no fruit juices, fruit juice-containing beverages, vegetable beverages, *Lactobacillus lactis* beverages, tea beverages, carbonate beverages, coffee beverages, soup beverages, alcoholic beverages, mineral-containing beverages, vitamin-containing beverages, and functional food material-containing beverages; milk or manufactured products comprising milk as a main raw material, such as soya milk beverages, milk beverages, *Lactobacillus lactis* beverages, fermented milk, condensed milk, concentrated milk, yogurt, and ice cream; dessert foods such as jelly, Bavarian cream (bavarois), and pudding; confectionaries such as chocolates, caramel, candy, snack foods; seasonings such as clear soups, gravy sauces, and dressings; precooked foods such as retort pouch foods; and other instant foods; and the like. The flavor for the deterioration preventive or foodstuff of the present invention is preferably used for the beverages and the dessert foods.

The amount of the deterioration preventive of the present invention to the foodstuff is not particularly limited, and varies depending upon the purity of the components of the deterioration preventive used, the formulation ratio, and the kinds of the foodstuff to be added. It is preferable that the deterioration preventive is generally added within the range of from 0.005 to 0.5% by weight of the components of the foodstuff, from the viewpoint of sufficiently suppressing the deterioration of the flavor components, and even more preferably, the amount of from 0.01 to 0.3% by weight is preferable. It is preferable that the amount is 0.005% by weight or more because satisfactory effects are obtained, and that the amount is 0.5% by weight or less because the flavor of the deterioration preventive does not affect the taste of the foodstuff.

On the other hand, the amount of the flavor of the present invention to the foodstuff is not particularly limited. The amount cannot be flatly determined because the amount varies depending upon the components of the flavor components in the flavor and the kinds of the foodstuff to be added. It is desired that the amount of the flavor in the components of the foodstuff is usually from 0.001 to 1.0% by weight, preferably from 0.01 to 0.5% by weight, from the viewpoint of appropriately exhibiting the flavor.

The present invention will be described more specifically hereinbelow by means of Examples, without intending to limit the present invention thereto. Unless specified otherwise, "%" as used herein means "% by weight."

Example 1-1

As a polyhydric alcohol mixture, 2 g of pentaglycerol monomyristate (manufactured by Taiyo Kagaku Co., Ltd., HLB value: 14, pentaglycerol content in polyglycerol composition: 45%), which is a polyglycerol fatty acid ester, and 2 g of ferulic acid (ferulic acid content: 98% or more, manufactured by Tsuno Food Industrial Co., Ltd.) were added to 95 g of glycerol (manufactured by NOF Corporation), and the mixture was dissolved by heating the mixture to 65° C. One gram of extracted tocopherol (manufactured by Tama Biochemical Co., Ltd., d-δ-tocopherol content: 86%) was added as an oil phase to the polyhydric alcohol mixture, and the mixture was emulsified with a homomixer (manufactured by Tokushu Kika Kogyo Co., Ltd.) at a rotational speed of 7000 rpm, to give a deterioration preventive of the inventive product 1.

Example 1-2

As a polyhydric alcohol mixture, 2 g of pentaglycerol monomyristate (manufactured by Taiyo Kagaku Co., Ltd., HLB value: 14, pentaglycerol content in polyglycerol composition: 45%), which is a polyglycerol fatty acid ester, 1 g of ferulic acid (ferulic acid content: 98% or more, manufactured by Tsuno Food Industrial Co., Ltd.) and 1 g of a green tea extract (trade name: SUNPHENON BG, catechin content: 70%, manufactured by Taiyo Kagaku Co., Ltd.) were added to 95 g of glycerol (manufactured by NOF Corporation), and the mixture was dissolved by heating the mixture to 65° C. One gram of extracted tocopherol (manufactured by Tama Biochemical Co., Ltd., δ-tocopherol content: 86%) was added as an oil phase to the polyhydric alcohol mixture, and the mixture was emulsified with a homomixer (manufactured by Tokushu Kika Kogyo Co., Ltd.) at a rotational speed of 7000 rpm, to give a deterioration preventive of the inventive product 2.

Example 1-3

As a polyhydric alcohol mixture, 2 g of pentaglycerol monomyristate (manufactured by Taiyo Kagaku Co., Ltd., HLB value: 13, pentaglycerol content in polyglycerol composition: 15%), which is a polyglycerol fatty acid ester, 1 g of ferulic acid (ferulic acid content: 98% or more, manufactured by Tsuno Food Industrial Co., Ltd.) and 1 g of a green tea extract (trade name: SUNPHENON BG, catechin content: 70%, manufactured by Taiyo Kagaku Co., Ltd.) were added to 95 g of glycerol (manufactured by NOF Corporation), and the mixture was dissolved by heating the mixture to 65° C. One gram of extracted tocopherol (manufactured by Tama Biochemical Co., Ltd., δ-tocopherol content: 86%) was added as an oil phase to the polyhydric alcohol mixture, and the mixture was emulsified with a homomixer (manufactured by Tokushu Kika Kogyo Co., Ltd.) at a rotational speed of 7000 rpm, to give a deterioration preventive of the inventive product 3.

Example 1-4

As a polyhydric alcohol mixture, 5 g of pentaglycerol monooleate (manufactured by Taiyo Kagaku Co., Ltd., HLB value: 14, pentaglycerol content in polyglycerol composition: 45%), which is a polyglycerol fatty acid ester, 2 g of ferulic acid (ferulic acid content: 98% or more, manufactured by Tsuno Food Industrial Co., Ltd.) and 3 g of a green tea extract (trade name: SUNPHENON BG, catechin content: 70%, manufactured by Taiyo Kagaku Co., Ltd.) were added to 80 g of glycerol (manufactured by NOF Corporation), and the mixture was dissolved by heating the mixture to 65° C. Ten grams of extracted tocopherol (manufactured by Tama Biochemical Co., Ltd., δ-tocopherol content: 86%) was added as an oil phase to the polyhydric alcohol mixture, and the mixture was emulsified with a homomixer (manufactured by Tokushu Kika Kogyo Co., Ltd.) at a rotational speed of 7000 rpm, to give a deterioration preventive of the inventive product 4.

Comparative Example 1-1

As a polyhydric alcohol mixture, 2 g of citric and stearic acid esters of glycerol (manufactured by Taiyo Kagaku Co., Ltd., HLB value: 8), which is an organic acid monoglyceride, and 2 g of ferulic acid (ferulic acid content: 98% or more, manufactured by Tsuno Food Industrial Co., Ltd.) were added to 95 g of glycerol (manufactured by NOF Corporation), and the mixture was dissolved by heating the mixture to 65° C. One gram of extracted tocopherol (manufactured by Tama Biochemical Co., Ltd., δ-tocopherol content: 86%) was added as an oil phase to the polyhydric alcohol mixture, and the mixture was emulsified with a homomixer (manufactured by Tokushu Kika Kogyo Co., Ltd.) at a rotational speed of 7000 rpm, to give a deterioration preventive of the comparative product 1.

Comparative Example 1-2

As a polyhydric alcohol mixture, 2 g of soybean lecithin (manufactured by Taiyo Kagaku Co., Ltd., HLB value: 7), 1 g of ferulic acid (ferulic acid content: 98% or more, manufactured by Tsuno Food Industrial Co., Ltd.) and 1 g of a green tea extract (trade name: SUNPHENON BG, catechin content: 70%, manufactured by Taiyo Kagaku Co., Ltd.) were added to 95 g of glycerol (manufactured by NOF Corporation), and the mixture was dissolved by heating the mixture to 65° C. One gram of extracted tocopherol (manufactured by Tama Biochemical Co., Ltd., δ-tocopherol content: 86%) was added as an oil phase to the polyhydric alcohol mixture, and the mixture was emulsified with a homomixer (manufactured by Tokushu Kika Kogyo Co., Ltd.) at a rotational speed of 7000 rpm, to give a deterioration preventive of the comparative product 2.

Comparative Example 1-3

As a polyhydric alcohol mixture, 2 g of sucrose stearic acid ester (manufactured by Mitsubishi-Kagaku Foods Corporation, HLB value: 8), which is a sucrose fatty acid ester, 1 g of ferulic acid (ferulic acid content: 98% or more, manufactured by Tsuno Food Industrial Co., Ltd.) and 1 g of a green tea extract (trade name: SUNPHENON BG, catechin content: 70%, manufactured by Taiyo Kagaku Co., Ltd.) were added to 95 g of glycerol (manufactured by NOF Corporation), and the mixture was dissolved by heating the mixture to 65° C. One gram of extracted tocopherol (manufactured by Tama Biochemical Co., Ltd., δ-tocopherol content: 86%) was added as an oil phase to the polyhydric alcohol mixture, and the mixture was emulsified with a homomixer (manufactured by Tokushu Kika Kogyo Co., Ltd.) at a rotational speed of 7000 rpm, to give a deterioration preventive of the comparative product 3.

Comparative Example 1-4

As a polyhydric alcohol mixture, 2 g of gum arabic (manufactured by Sankyo Foods Industry Corp.), 1 g of ferulic acid (ferulic acid content: 98% or more, manufactured by Tsuno Food Industrial Co., Ltd.) and 1 g of a green tea extract (trade name: SUNPHENON BG, catechin content: 70%, manufactured by Taiyo Kagaku Co., Ltd.) were added to 95 g of glycerol (manufactured by NOF Corporation), and the mixture was dissolved by heating the mixture to 65° C. One gram of extracted tocopherol (manufactured by Tama Biochemical Co., Ltd., δ-tocopherol content: 86%) was added as an oil phase to the polyhydric alcohol mixture, and the mixture was emulsified with a homomixer (manufactured by Tokushu Kika Kogyo Co., Ltd.) at a rotational speed of 7000 rpm, to give a deterioration preventive of the comparative product 4.

Example 1-5

High fructose corn syrup 10%, citric acid 0.25% and sodium citrate 0.05% were dissolved in water 90%, to prepare an acidic sugar solution having Bx. of 7.5, pH: 2.8. Each of the inventive products 1 to 4 obtained in Examples 1-1 to 1-4 was added to the acidic sugar solution in an amount of 0.1%, and the mixture was thermally sterilized at a temperature of 93° C. Thereafter, the mixture was hot-packed in a colorless, transparent glass bottle. The mixture was cooled, to give acidic sugar solutions of the inventive products 5 to 8. Furthermore, each of the comparative products 1 to 4 obtained in Comparative Examples 1-1 to 1-4 was added in an amount of 0.1% instead of adding the inventive products 1 to 4 in an amount of 0.1%, to give acidic sugar solutions of the comparative products 5 to 8.

Test Example 1

The turbidity of each of the acidic sugar solutions containing each of the deterioration preventives obtained in Example 1-5 was determined in terms of an absorption luminosity at a wavelength of 650 nm with a spectrophotometer, and the state was visually confirmed. Also, the average particle size thereof was determined with a particle size distribution analyzer (manufactured by Beckmann Coulter: L-230). Further, the acidic sugar solution was stored at 55° C. for 2 weeks, and the turbidity and the average particle size after storage were determined in the same manner, and the state was visually confirmed.

TABLE 1

| | Immediately After Preparation | | After Storage at 55° C. for 2 weeks | |
|---|---|---|---|---|
| | Turbidity (Visually Observed) | Average Particle Size (μm) | Turbidity (Visually Observed) | Average Particle Size (μm) |
| Inventive Product 5 | 0.0028 (transparent) | 0.087 | 0.0026 (transparent) | 0.085 |
| Inventive Product 6 | 0.0030 (transparent) | 0.09 | 0.0031 (transparent) | 0.089 |
| Inventive Product 7 | 0.0401 (translucent) | 0.525 | 0.0453 (translucent) | 0.529 |
| Inventive Product 8 | 0.1027 (translucent) | 0.846 | 0.1045 (translucent) | 0.852 |
| Comparative Product 5 | 0.1846 (precipitated) | 15.79 | Separated, Incapable Measurement | Separated, Incapable Measurement |
| Comparative Product 6 | 0.0610 (precipitated) | 22.49 | Separated, Incapable Measurement | Separated, Incapable Measurement |
| Comparative Product 7 | 1.0781 (white turbid), | 1.547 | 2.846 (white turbid, formation of white separate layer in upper portion) | 3.827 |
| Comparative Product 8 | 1.3950 (white turbid) | 2.395 | Separated, Incapable Measurement | Separated, Incapable Measurement |

As is clear from Table 1, the inventive products had an emulsion particle size of 1 μm or less, and did not show separation or the like even after storage at 55° C. for 2 weeks, thereby being stable, as compared to the comparative products.

The deterioration preventives of the inventive products 1 to 4 of the present invention did not show separation, crystals and the like, thereby being stable, while the deterioration preventives of the comparative products 1 to 4 became non-uniform during storage, and showed needle-like crystals presumably derived from ferulic acid.

Comparative Example 1-5

As a polyhydric alcohol mixture, 2 g of pentaglycerol monomyristate (manufactured by Taiyo Kagaku Co., Ltd., HLB value: 14, pentaglycerol content in polyglycerol composition: 45%), which is a polyglycerol fatty acid ester, and 3 g of ferulic acid (ferulic acid content: 98% or more, manufactured by Tsuno Food Industrial Co., Ltd.) were added to 95 g of glycerol (manufactured by NOF Corporation), and the mixture was dissolved by heating the mixture to 65° C. The mixture was emulsified with a homomixer (manufactured by Tokushu Kika Kogyo Co., Ltd.) at a rotational speed of 7000 rpm, to give a deterioration preventive of the comparative product 9.

Comparative Example 1-6

As a polyhydric alcohol mixture, 2 g of pentaglycerol monomyristate (manufactured by Taiyo Kagaku Co., Ltd., HLB value: 14, pentaglycerol content in polyglycerol composition: 45%), which is a polyglycerol fatty acid ester, was added to 95 g of glycerol (manufactured by NOF Corporation), and the mixture was dissolved by heating the mixture to 65° C. Three grams of extracted tocopherol (manufactured by Tama Biochemical Co., Ltd., δ-tocopherol content: 86%) was added as an oil phase to the polyhydric alcohol mixture, and the mixture was emulsified with a homomixer (manufactured by Tokushu Kika Kogyo Co., Ltd.) at a rotational speed of 7000 rpm, to give a deterioration preventive of the comparative product 10.

Comparative Example 1-7

As a polyhydric alcohol mixture, 2 g of pentaglycerol monomyristate (manufactured by Taiyo Kagaku Co., Ltd., HLB value: 14, pentaglycerol content in polyglycerol composition: 45%), which is a polyglycerol fatty acid ester, and 3 g of a green tea extract (trade name: SUNPHENON BG, catechin content: 70%, manufactured by Taiyo Kagaku Co., Ltd.) were added to 95 g of glycerol (manufactured by NOF Corporation), and the mixture was dissolved by heating the mixture to 65° C. The mixture was emulsified with a homomixer (manufactured by Tokushu Kika Kogyo Co., Ltd.) at a rotational speed of 7000 rpm, to give a deterioration preventive of the comparative product 11.

Comparative Example 1-8

As a polyhydric alcohol mixture, 2 g of pentaglycerol monomyristate (manufactured by Taiyo Kagaku Co., Ltd., HLB value: 14, pentaglycerol content in polyglycerol composition: 45%), which is a polyglycerol fatty acid ester, and 2 g of enzyme-treated rutin (manufactured by Kiriya Chemical Co. Ltd., enzyme-treated rutin: 50%) were added to 95 g of glycerol (manufactured by NOF Corporation), and the mixture was dissolved by heating the mixture to 65° C. One gram of extracted tocopherol (manufactured by Tama Biochemical Co., Ltd., δ-tocopherol content: 86%) was added as an oil phase to the polyhydric alcohol mixture, and the mixture was emulsified with a homomixer (manufactured by Tokushu Kika Kogyo Co., Ltd.) at a rotational speed of 7000 rpm, to give a deterioration preventive of the comparative product 12.

Comparative Example 1-9

As a polyhydric alcohol mixture, 2 g of pentaglycerol monomyristate (manufactured by Taiyo Kagaku Co., Ltd., HLB value: 14, pentaglycerol content in polyglycerol composition: 45%), which is a polyglycerol fatty acid ester, and 2 g of a myrica extract (manufactured by San-Ei Gen F.F.I., Inc., myrica extract: 20%) were added to 95 g of glycerol (manufactured by NOF Corporation), and the mixture was dissolved by heating the mixture to 65° C. One gram of extracted tocopherol (manufactured by Tama Biochemical Co., Ltd., δ-tocopherol content: 86%) was added as an oil phase to the polyhydric alcohol mixture, and the mixture was emulsified with a homomixer (manufactured by Tokushu Kika Kogyo Co., Ltd.) at a rotational speed of 7000 rpm, to give a deterioration preventive of the comparative product 13.

Example 1-6

Granulated sugar 10%, citric acid 0.15%, sodium citrate 0.02% and lemon essence 0.1% were dissolved in water 90%, to prepare a lemon beverage base having Bx. of 7.5, pH=3. Each of the inventive products 1 to 3 obtained in Examples 1-1 to 1-3 was added to the lemon beverage base in an amount of 0.1%, and the mixture was thermally sterilized at a temperature of 93° C. Thereafter, the mixture was hot-packed in a colorless, transparent PET bottle. The mixture was cooled, to give lemon beverages of the inventive products 9 to 11. Furthermore, each of the comparative products 9 to 13 obtained in Comparative Examples 1-5 to 1-9 was added in an amount of 0.1% instead of adding the inventive products 1 to 3 in an amount of 0.1%, to give lemon beverages of the comparative products 14 to 18. Furthermore, a lemon beverage of the comparative product 19 which does not contain the inventive product 1 was obtained in the same manner.

Test Example 1-2

Each of the lemon beverages obtained in Example 1-6 were allowed to stand for 8 hours under direct sun light (average temperature: 23° C.). Thereafter, the sensory evaluation was made on the extent of flavor deterioration against a sample stored in a refrigerator (light shielded) at 5° C. as a standard by 10 well trained panelists. The results are shown in Table 2.

TABLE 2

|  | Sensory Evaluation | Residual Ratio of Citral (%) |
|---|---|---|
| Inventive Product 9 | 4.2 | 85 |
| Inventive Product 10 | 4.8 | 90 |
| Inventive Product 11 | 4.3 | 81 |
| Comparative Product 14 | 1.3 | 42 |
| Comparative Product 15 | 1.9 | 28 |
| Comparative Product 16 | 3.0 | 49 |
| Comparative Product 17 | 2.4 | 34 |
| Comparative Product 18 | 2.1 | 30 |
| Comparative Product 19 | 1.2 | 26 |

Here, the score for evaluation in Table 2 is an average score of each of the panelists rated on the basis of the following criteria.
(Evaluation Criteria)
Equivalent to refrigerator-stored sample (no change): Score 5
Slightly changed as compared to refrigerator-stored sample: Score 4
Somewhat changed as compared to refrigerator-stored sample: Score 3
Fairly changed as compared to refrigerator-stored sample: Score 2
Remarkably changed as compared to refrigerator-stored sample: Score 1
The amount of citral, a flavor component distinctive to citruses such as lemon, was determined by high-performance liquid chromatography (HPLC), and the extent of deterioration of taste was evaluated by the residual ratio thereof. The higher the residual ratio of citral, the smaller the deterioration of taste. The results are shown in Table 2.

The determination conditions for the amount of citral are as follows.
(Determination Conditions)
Apparatus: CLASS-LC10 (manufactured by Shimadzu Corporation)
Column: CAPCELL PAK C18 UG120 (SHISEIDO)
Eluent: 60% methanol/water
Flow rate: 1 ml/min
Detection wavelength: UV 240 nm
Also, the residual ratio (%) of citral was calculated according to the following formula, wherein
the amount of citral in the refrigerator-stored sample is A, and the amount of citral in the photo-irradiated sample is B:

$(B/A) \times 100$ = Residual Ratio (%) of Citral

As is clear from Table 2, the inventive products effectively prevented deterioration of taste by light as compared to the comparative products. In addition, the inventive products showed higher residual ratios of citral, a flavor component of lemon, and effectively maintained fresh taste of lemon as compared to the comparative products.

Example 1-7

As a polyhydric alcohol mixture, 5 g of pentaglycerol monostearate (manufactured by Taiyo Kagaku Co., Ltd., HLB value: 14, pentaglycerol content in polyglycerol composition: 45%), which is a polyglycerol fatty acid ester, and 5 g of ferulic acid (ferulic acid content: 98% or more, manufactured by Tsuno Food Industrial Co., Ltd.) were added to 80 g of hydrogenated starch hydrolysate (manufactured by Towa Chemical Industry Co., Ltd.), and the mixture was dissolved by heating the mixture to 65° C. Five grams of coffee oil-based flavor (manufactured by International Flavors & Fragrances (Japan) Ltd.) and 5 g of extracted tocopherol (manufactured by Tama Biochemical Co., Ltd., δ-tocopherol content: 86%) were mixed, and the mixture was added as an oil phase to the polyhydric alcohol mixture. The mixture was emulsified with a homomixer (manufactured by Tokushu Kika Kogyo Co., Ltd.) at a rotational speed of 7000 rpm, to give a coffee emulsion flavor of the inventive product 12.

Example 1-8

As a polyhydric alcohol mixture, 5 g of pentaglycerol monostearate (manufactured by Taiyo Kagaku Co., Ltd., HLB value: 14, pentaglycerol content in polyglycerol composition: 45%), which is a polyglycerol fatty acid ester, 2 g of ferulic acid (ferulic acid content: 98% or more, manufactured by Tsuno Food Industrial Co., Ltd.) and 3 g of a green tea extract (trade name: SUNPHENON BG, catechin content: 70%, manufactured by Taiyo Kagaku Co., Ltd.) were added to 80 g of hydrogenated starch hydrolysate (manufactured by Towa Chemical Industry Co., Ltd.), and the mixture was dissolved by heating the mixture to 65° C. Five grams of coffee oil-based flavor (manufactured by International Flavors & Fragrances (Japan) Ltd.) and 5 g of extracted tocopherol (manufactured by Tama Biochemical Co., Ltd., δ-tocopherol content: 86%) were mixed, and the mixture was added as an oil phase to the polyhydric alcohol mixture. The mixture was emulsified with a homomixer (manufactured by Tokushu Kika Kogyo Co., Ltd.) at a rotational speed of 7000 rpm, to give a coffee emulsion flavor of the inventive product 13.

Comparative Example 1-10

As a polyhydric alcohol mixture, 5 g of pentaglycerol monostearate (manufactured by Taiyo Kagaku Co., Ltd., HLB value: 14, pentaglycerol content in polyglycerol composition: 45%), which is a polyglycerol fatty acid ester, was dissolved in 90 g of hydrogenated starch hydrolysate (manufactured by Towa Chemical Industry Co., Ltd.) by heating the mixture to 65° C. Five grams of coffee oil-based flavor (manufactured by International Flavors & Fragrances (Japan) Ltd.) was added as an oil phase to the polyhydric alcohol mixture, and the mixture was emulsified with a homomixer (manufactured by Tokushu Kika Kogyo Co., Ltd.) at a rotational speed of 7000 rpm, to give a coffee emulsion flavor of the comparative product 20.

Comparative Example 1-11

As a polyhydric alcohol mixture, 5 g of pentaglycerol monostearate (manufactured by Taiyo Kagaku Co., Ltd., HLB value: 14, pentaglycerol content in polyglycerol composition: 45%), which is a polyglycerol fatty acid ester, and 10 g of ferulic acid (ferulic acid content: 98% or more, manufactured by Tsuno Food Industrial Co., Ltd.) were added to 80 g of hydrogenated starch hydrolysate (manufactured by Towa Chemical Industry Co., Ltd.), and the mixture was dissolved by heating the mixture to 65° C. Five grams of coffee oil-based flavor (manufactured by International Flavors & Fragrances (Japan) Ltd.) was added as an oil phase to the polyhydric alcohol mixture, and the mixture was emulsified with a homomixer (manufactured by Tokushu Kika Kogyo Co., Ltd.) at a rotational speed of 7000 rpm, to give a coffee emulsion flavor of the comparative product 21.

Comparative Example 1-12

As a polyhydric alcohol mixture, 5 g of pentaglycerol monostearate (manufactured by Taiyo Kagaku Co., Ltd., HLB value: 14, pentaglycerol content in polyglycerol composition: 45%), which is a polyglycerol fatty acid ester, was added to 80 g of hydrogenated starch hydrolysate (manufactured by Towa Chemical Industry Co., Ltd.), and the mixture was dissolved by heating the mixture to 65° C. Five grams of coffee oil-based flavor (manufactured by International Flavors & Fragrances (Japan) Ltd.) and 10 g of extracted tocopherol (manufactured by Tama Biochemical Co., Ltd., δ-tocopherol content: 86%) were mixed, and the mixture was added as an oil phase to the polyhydric alcohol mixture. The mixture was emulsified with a homomixer (manufactured by Tokushu Kika Kogyo Co., Ltd.) at a rotational speed of 7000 rpm, to give a coffee emulsion flavor of the comparative product 22.

Comparative Example 1-13

As a polyhydric alcohol mixture, 5 g of pentaglycerol monostearate (manufactured by Taiyo Kagaku Co., Ltd., HLB value: 14, pentaglycerol content in polyglycerol composition: 45%), which is a polyglycerol fatty acid ester, and 10 g of a green tea extract (trade name: SUNPHENON BG, catechin content: 70%, manufactured by Taiyo Kagaku Co., Ltd.) were added to 80 g of hydrogenated starch hydrolysate (manufactured by Towa Chemical Industry Co., Ltd.), and the mixture was dissolved by heating the mixture to 65° C. Five grams of coffee oil-based flavor (manufactured by International Flavors & Fragrances (Japan) Ltd.) was mixed, and the mixture was added as an oil phase to the polyhydric alcohol mixture. The mixture was emulsified with a homomixer (manufactured by Tokushu Kika Kogyo Co., Ltd.) at a rotational speed of 7000 rpm, to give a coffee emulsion flavor of the comparative product 23.

Comparative Example 1-14

As a polyhydric alcohol mixture, 5 g of pentaglycerol monostearate (manufactured by Taiyo Kagaku Co., Ltd., HLB value: 14, pentaglycerol content in polyglycerol composition: 45%), which is a polyglycerol fatty acid ester, and 10 g of a green coffee bean extract (manufactured by T. Hasegawa Co., Ltd., chlorogenic acid content: 30%) were added to 80 g of hydrogenated starch hydrolysate (manufactured by Towa Chemical Industry Co., Ltd.), and the mixture was dissolved by heating the mixture to 65° C. Five grams of coffee oil-based flavor (manufactured by International Flavors & Fragrances (Japan) Ltd.) was added as an oil phase to the polyhydric alcohol mixture, and the mixture was emulsified with a homomixer (manufactured by Tokushu Kika Kogyo Co., Ltd.) at a rotational speed of 7000 rpm, to give a coffee emulsion flavor of the comparative product 24.

Comparative Example 1-15

As a polyhydric alcohol mixture, 5 g of pentaglycerol monostearate (manufactured by Taiyo Kagaku Co., Ltd., HLB value: 14, pentaglycerol content in polyglycerol composition: 45%), which is a polyglycerol fatty acid ester, and 10 g of a grape seed extract (manufactured by Kikkoman Corporation, proanthocyanidin: 38% or more) were added to 80 g of hydrogenated starch hydrolysate (manufactured by Towa Chemical Industry Co., Ltd.), and the mixture was dissolved by heating the mixture to 65° C. Five grams of coffee oil-based flavor (manufactured by International Flavors & Fragrances (Japan) Ltd.) was added as an oil phase to the polyhydric alcohol mixture, and the mixture was emulsified with a homomixer (manufactured by Tokushu Kika Kogyo Co., Ltd.) at a rotational speed of 7000 rpm, to give a coffee emulsion flavor of the comparative product 25.

Test Example 1-3

The coffee emulsion flavors of the inventive products 12 and 13 obtained in Examples 1-7 and 1-8 and the comparative products 20 to 25 obtained in Comparative Examples 1-10 to 1-15 were stored at 37° C. for 2 months. Thereafter, the sensory evaluation was made on the extent of flavor deterioration thereof against a sample stored in a refrigerator at 5° C. used as a standard by 10 well trained panelists. The evaluation was rated on the basis of the same criteria as those of Test Example 2. The results are shown in Table 3.

TABLE 3

| | Coffee Bean Flavor | Off Flavor |
| --- | --- | --- |
| Inventive Product 12 | 4.2 | 4.1 |
| Inventive Product 13 | 4.5 | 4.8 |
| Comparative Product 20 | 1.3 | 1.2 |
| Comparative Product 21 | 2.1 | 2 |
| Comparative Product 22 | 2.6 | 3 |

TABLE 3-continued

| | Coffee Bean Flavor | Off Flavor |
| --- | --- | --- |
| Comparative Product 23 | 2.4 | 2.3 |
| Comparative Product 24 | 2.4 | 2.5 |
| Comparative Product 25 | 1.9 | 1.7 |

As is clear from Table 3, the inventive products effectively prevented flavor deterioration during storage and remarkably suppressed the generation of off flavor as compared to the comparative products.

Example 1-9

To 250 g of coffee beans (L value: 18) was added boiling water in an amount of about 10 times the weight of the coffee beans, to give 2500 g of a coffee extract having Bx. of 2.5. Using this extract, a coffee beverage was prepared according to the ratio shown in the following <Formula 1>. The coffee emulsion flavor of the inventive product 12 or 13 obtained in Example 1-7 or 1-8 was added to the coffee beverage in an amount of 0.1%, and the mixture was then homogenized with a homogenizer (150 kg/cm2). The mixture was sterilized by UHT sterilization (142° C., 30 seconds), and thereafter each of 350 ml transparent PET bottles was filled with the mixture, to give PET-bottled coffee beverages of the inventive products 14 and 15. Furthermore, each of the comparative products 20 to 25 obtained in Comparative Examples 1-10 to 1-15 was added in an amount of 0.1% instead of adding the inventive product 7 or 8 in an amount of 0.1%, to give PET-bottled coffee beverages of the comparative products 26 to 31.

<Formulation 1>

| Raw Material | Blending Ratio (%) |
| --- | --- |
| Coffee Extract | 25 |
| Granulated Sugar | 6 |
| Milk | 20 |
| pH Adjusting Agent (Sodium Bicarbonate) | 0.06 |
| Sugar Ester (HLB: 16) | 0.04 |
| Water | 48.9 |
| Total | 100.0 |

Test Example 1-4

Each of the PET-bottled coffee beverages obtained in Example 1-9 was stored at 55° C. for 2 weeks or 1 month. Thereafter, the sensory evaluation was made on the extent of flavor deterioration thereof against a sample stored in a refrigerator (light shielded) at 5° C. as a standard by 10 well trained panelists. The evaluation was rated on the basis of the same criteria as those of Test Example 1-2. The results are shown in Table 4.

In addition, each of the PET-bottled coffee beverages was stored under irradiation with a fluorescent lamp of 20000 luxes for 1 month. The sensory evaluation was made on the extent of flavor deterioration thereof against a sample stored in a refrigerator (light shielded) at 5° C. used as a standard by 10 well trained panelists. The evaluation was rated on the basis of the same criteria as those of Test Example 1-2. The results are shown in Table 4.

TABLE 4

|  | 55° C., 2 weeks | 55° C., 2 months | 20000 lx, 1 month |
|---|---|---|---|
| Inventive Product 14 | 4.6 | 4.0 | 4.6 |
| Inventive Product 15 | 4.8 | 4.6 | 4.7 |
| Comparative Product 26 | 1.3 | 1.0 | 1.1 |
| Comparative Product 27 | 1.8 | 1.2 | 2.9 |
| Comparative Product 28 | 3.1 | 2.6 | 2.8 |
| Comparative Product 29 | 2.4 | 1.7 | 2.7 |
| Comparative Product 30 | 2.2 | 1.5 | 2.7 |
| Comparative Product 31 | 1.6 | 1.1 | 1.7 |

As is clear from Table 4, by the use of the coffee flavor to which the deterioration preventive of the inventive product was added, it was clarified that the deterioration by heat and light is effectively prevented, and off flavor to be generated is remarkably suppressed. The inventive product 15 showed somewhat changed taste even after 2 months at 55° C., and sufficiently exhibited an effect of preventing the deterioration even in a long-term storage.

Example 1-10

As a polyhydric alcohol mixture, 2 g of pentaglycerol monooleate (manufactured by Taiyo Kagaku Co., Ltd., HLB value: 13, pentaglycerol content in polyglycerol composition: 45%), which is a polyglycerol fatty acid ester, and 3 g of ferulic acid (ferulic acid content: 98% or more, manufactured by Tsuno Food Industrial Co., Ltd.) were added to 91 g of sorbitol (manufactured by Towa Chemical Industry Co., Ltd), and the mixture was dissolved by heating the mixture to 65° C. One gram of milk oil-based flavor (manufactured by International Flavors & Fragrances (Japan) Ltd.) and 3 g of extracted tocopherol (manufactured by Tama Biochemical Co., Ltd., δ-tocopherol content: 86%) were mixed, and the mixture was added as an oil phase to the polyhydric alcohol mixture. The mixture was emulsified with a homomixer (manufactured by Tokushu Kika Kogyo Co., Ltd.) at a rotational speed of 7000 rpm, to give a milk emulsion flavor of the inventive product 16.

Example 1-11

As a polyhydric alcohol mixture, 2 g of pentaglycerol monooleate (manufactured by Taiyo Kagaku Co., Ltd., HLB value: 13, pentaglycerol content in polyglycerol composition: 45%), which is a polyglycerol fatty acid ester, 2 g of ferulic acid (ferulic acid content: 98% or more, manufactured by Tsuno Food Industrial Co., Ltd.) and 1 g of a green tea extract (trade name: SUNPHENON BG, catechin content: 70%, manufactured by Taiyo Kagaku Co., Ltd.) were added to 91 g of sorbitol (manufactured by Towa Chemical Industry Co., Ltd), and the mixture was dissolved by heating the mixture to 65° C. One gram of milk oil-based flavor (manufactured by International Flavors & Fragrances (Japan) Ltd.) and 3 g of extracted tocopherol (manufactured by Tama Biochemical Co., Ltd., δ-tocopherol content: 86%) were mixed, and the mixture was added as an oil phase to the polyhydric alcohol mixture. The mixture was emulsified with a homomixer (manufactured by Tokushu Kika Kogyo Co., Ltd.) at a rotational speed of 7000 rpm, to give a milk emulsion flavor of the inventive product 17.

Comparative Example 1-16

As a polyhydric alcohol mixture, 2 g of pentaglycerol monooleate (manufactured by Taiyo Kagaku Co., Ltd., HLB value: 13, pentaglycerol content in polyglycerol composition: 45%), which is a polyglycerol fatty acid ester, was added to 97 g of sorbitol (manufactured by Towa Chemical Industry Co., Ltd), and the mixture was dissolved by heating the mixture to 65° C. One gram of milk oil-based flavor (manufactured by International Flavors & Fragrances (Japan) Ltd.) was added as an oil phase to the polyhydric alcohol mixture, and the mixture was emulsified with a homomixer (manufactured by Tokushu Kika Kogyo Co., Ltd.) at a rotational speed of 7000 rpm, to give a milk emulsion flavor of the comparative product 32.

Comparative Example 1-17

As a polyhydric alcohol mixture, 2 g of pentaglycerol monooleate (manufactured by Taiyo Kagaku Co., Ltd., HLB value: 14, pentaglycerol content in polyglycerol composition: 45%), which is a polyglycerol fatty acid ester, and 6 g of ferulic acid (ferulic acid content: 98% or more, manufactured by Tsuno Food Industrial Co., Ltd.) were added to 91 g of sorbitol (manufactured by Towa Chemical Industry Co., Ltd), and the mixture was dissolved by heating the mixture to 65° C. One gram of milk oil-based flavor (manufactured by International Flavors & Fragrances (Japan) Ltd.) was added as an oil phase to the polyhydric alcohol mixture, and the mixture was emulsified with a homomixer (manufactured by Tokushu Kika Kogyo Co., Ltd.) at a rotational speed of 7000 rpm, to give a milk emulsion flavor of the comparative product 33.

Comparative Example 1-18

As a polyhydric alcohol mixture, 2 g of pentaglycerol monooleate (manufactured by Taiyo Kagaku Co., Ltd., HLB value: 14, pentaglycerol content in polyglycerol composition: 45%), which is a polyglycerol fatty acid ester, was added to 91 g of sorbitol (manufactured by Towa Chemical Industry Co., Ltd), and the mixture was dissolved by heating the mixture to 65° C. One gram of milk oil-based flavor (manufactured by International Flavors & Fragrances (Japan) Ltd.) and 6 g of extracted tocopherol (manufactured by Tama Biochemical Co., Ltd., δ-tocopherol content: 86%) were mixed, and the mixture was added as an oil phase to the polyhydric alcohol mixture. The mixture was emulsified with a homomixer (manufactured by Tokushu Kika Kogyo Co., Ltd.) at a rotational speed of 7000 rpm, to give a milk emulsion flavor of the comparative product 34.

Comparative Example 1-19

As a polyhydric alcohol mixture, 2 g of pentaglycerol monooleate (manufactured by Taiyo Kagaku Co., Ltd., HLB value: 14, pentaglycerol content in polyglycerol composition: 45%), which is a polyglycerol fatty acid ester, and 6 g of a green tea extract (trade name: SUNPHENON BG, catechin content: 70%, manufactured by Taiyo Kagaku Co., Ltd.) were added to 91 g of sorbitol (manufactured by Towa Chemical Industry Co., Ltd), and the mixture was dissolved by heating the mixture to 65° C. One gram of milk oil-based flavor (manufactured by International Flavors & Fragrances (Japan) Ltd.) was mixed, and added as an oil phase to the polyhydric alcohol mixture. The mixture was emulsified with a homomixer (manufactured by Tokushu Kika Kogyo Co., Ltd.) at a rotational speed of 7000 rpm, to give a milk emulsion flavor of the comparative product 35.

Comparative Example 1-20

As a polyhydric alcohol mixture, 2 g of pentaglycerol monooleate (manufactured by Taiyo Kagaku Co., Ltd., HLB value: 14, pentaglycerol content in polyglycerol composition: 45%), which is a polyglycerol fatty acid ester, and 3 g of a rosemary extract (manufactured by Mitsubishi Chemical Corporation, rosemary extract content: 45%) were added to 91 g of sorbitol (manufactured by Towa Chemical Industry Co., Ltd), and the mixture was dissolved by heating the mixture to 65° C. One gram of milk oil-based flavor (manufactured by International Flavors & Fragrances (Japan) Ltd.) and 3 g of extracted tocopherol (manufactured by Tama Biochemical Co., Ltd., δ-tocopherol content: 86%) were mixed, and the mixture was added as an oil phase to the polyhydric alcohol mixture. The mixture was emulsified with a homomixer (manufactured by Tokushu Kika Kogyo Co., Ltd.) at a rotational speed of 7000 rpm, to give a milk emulsion flavor of the comparative product 36.

Comparative Example 1-21

As a polyhydric alcohol mixture, 2 g of pentaglycerol monomyristate (manufactured by Taiyo Kagaku Co., Ltd., HLB value: 14, pentaglycerol content in polyglycerol composition: 45%), which is a polyglycerol fatty acid ester, and 3 g of ascorbic acid (manufactured by Tanabe Seiyaku Co., Ltd.) were added to 91 g of sorbitol (manufactured by Towa Chemical Industry Co., Ltd), and the mixture was dissolved by heating the mixture to 65° C. One gram of milk oil-based flavor (manufactured by International Flavors & Fragrances (Japan) Ltd.) and 3 g of extracted tocopherol (manufactured by Tama Biochemical Co., Ltd., δ-tocopherol content: 86%) were mixed, and the mixture was added as an oil phase to the polyhydric alcohol mixture. The mixture was emulsified with a homomixer (manufactured by Tokushu Kika Kogyo Co., Ltd.) at a rotational speed of 7000 rpm, to give a milk emulsion flavor of the comparative product 37.

Example 1-12

Ninety-five grams of milk and 5 g of skim milk powder were mixed, sterilized (90° C., 15 minutes), and cooled (30° to 45° C.). Thereafter, the mixture was inoculated as a starter. The mixture was fermented to pH 4.3, and thereafter cooled, to give a yogurt base. On the other hand, 16 g of sugar, 1.2 g of pectin and 82.8 g of water were mixed, and thereafter the mixture was sterilized (95° C., 5 minutes), to give a syrup solution. The above-mentioned yogurt base and syrup solution were mixed in a ratio of 1:1, and the milk emulsion flavor of the inventive product 16 or 17 obtained in Example 1-10 or 1-11 was added thereto in an amount of 0.1%. The mixture was homogenized sterilely with a homomixer and a homogenizer (150 kg/cm2). Translucent plastic containers (120 ml) were filled with the mixture, to give yogurt beverages of the inventive products 18 and 19. Furthermore, each of the comparative products 32 to 37 obtained in Comparative Examples 1-16 to 1-21 was added in an amount of 0.1% in the same manner instead of adding the inventive product 16 or 17 in an amount of 0.1%, to give yogurt beverages of the comparative products 38 to 43.

Test Example 1-5

Each of the yoghurt beverages obtained in Example 1-12 was stored (at 5° C.) under irradiation with a fluorescent lamp of 20000 luxes for 2 weeks. Thereafter, the sensory evaluation was made on the extent of flavor deterioration thereof against a sample stored in a refrigerator (light shielded) at 5° C. as a standard by 10 well trained panelists. The evaluation was rated on the basis of the same criteria as those of Test Example 1-2. The results are shown in Table 5.

TABLE 5

| | 2000 lx, 2 weeks |
|---|---|
| Inventive Product 18 | 4.2 |
| Inventive Product 19 | 4.7 |
| Comparative Product 38 | 1.2 |
| Comparative Product 39 | 3.0 |
| Comparative Product 40 | 2.8 |
| Comparative Product 41 | 2.1 |
| Comparative Product 42 | 2.4 |
| Comparative Product 43 | 1.2 |

As is clear from Table 5, by the use of the milk flavor to which the deterioration preventive of the inventive product was added, the deterioration by light was effectively prevented, and off flavor to be generated was remarkably suppressed, as compared to the comparative products.

Example 1-13

Raw materials were mixed in the composition shown in the following <Formulation 2>. The mixture was dissolved by heating (90° C.), and thereafter homogenized with a homogenizer (150 kg/cm$^2$). The milk flavor of the inventive product 16 or 17 obtained in Example 1-10 or 1-11 was added thereto in an amount of 0.1%. Thereafter, the mixture was poured into each of 100 ml plastic containers, to give powdered green-tea puddings of the inventive products 20 and 21. Furthermore, each of the comparative products 36 to 37 obtained in Comparative Examples 1-16 to 1-21 was added in an amount of 0.1% instead of adding the inventive product 16 or 17 in an amount of 0.1%, to give powdered green-tea puddings of the comparative products 44 to 49.

<Formulation 2>

| Raw Material | Blending Ratio (%) |
|---|---|
| Milk | 30 |
| Granulated Sugar | 8 |
| Skim Milk Powder | 5.5 |
| Heavy Cream (content of milkfat: 40%) | 4 |
| Sweetened Whole Condensed Milk | 0.5 |
| Powdered Green Tea | 0.5 |
| Gelling Agent | 0.45 |
| Table Salt | 0.05 |
| Water | 51 |
| Total | 100.0 |

Test Example 1-6

Each of the powdered green-tea puddings obtained in Example 1-13 was stored (at 10° C.) under irradiation with a fluorescent lamp of 20000 luxes for 10 days. Thereafter, the sensory evaluation was made on the extent of flavor deterioration thereof against a sample stored in a refrigerator (light shielded) at 5° C. as a standard by 10 well trained panelists. The evaluation was rated on the basis of the same criteria as those of Test Example 1-2. The results are shown in Table 6.

TABLE 6

|  | 2000 lx, 10 days |
| --- | --- |
| Inventive Product 20 | 4.4 |
| Inventive Product 21 | 4.8 |
| Comparative Product 44 | 1.5 |
| Comparative Product 45 | 2.3 |
| Comparative Product 46 | 3.0 |
| Comparative Product 47 | 2.1 |
| Comparative Product 48 | 2.4 |
| Comparative Product 49 | 1.7 |

As is clear from Table 6, by the use of milk flavor to which the deterioration preventive of the inventive product was added, deterioration by light was effectively prevented, and off flavor to be generated was remarkably suppressed, as compared to the comparative products.

Example 1-14

As a polyhydric alcohol mixture, 3 g of pentaglycerol monopalmitate (manufactured by Taiyo Kagaku Co., Ltd., HLB value: 13, pentaglycerol content in polyglycerol composition: 45%), which is a polyglycerol fatty acid ester, and 3 g of ferulic acid (ferulic acid content: 98% or more, manufactured by Tsuno Food Industrial Co., Ltd.) were added to 88 g of glycerol (manufactured by NOF Corporation), and the mixture was dissolved by heating the mixture to 65° C. Three grams of yuzu orange essential oil (manufactured by Soda Aromatic Co., Ltd.) and 3 g of extracted tocopherol (manufactured by Tama Biochemical Co., Ltd., δ-tocopherol content: 86%) were mixed, and the mixture was added as an oil phase to the polyhydric alcohol mixture. The mixture was emulsified with a homomixer (manufactured by Tokushu Kika Kogyo Co., Ltd.) at a rotational speed of 7000 rpm, to give a yuzu orange emulsion flavor of the inventive product 22.

Example 1-15

As a polyhydric alcohol mixture, 3 g of pentaglycerol monopalmitate (manufactured by Taiyo Kagaku Co., Ltd., HLB value: 13, pentaglycerol content in polyglycerol composition: 45%), which is a polyglycerol fatty acid ester, 2 g of ferulic acid (ferulic acid content: 98% or more, manufactured by Tsuno Food Industrial Co., Ltd.) and 2 g of a green tea extract (trade name: SUNPHENON BG, catechin content: 70%, manufactured by Taiyo Kagaku Co., Ltd.) were added to 88 g of glycerol (manufactured by NOF Corporation), and the mixture was dissolved by heating the mixture to 65° C. Three grams of yuzu orange essential oil (manufactured by Soda Aromatic Co., Ltd.) and 2 g of extracted tocopherol (manufactured by Tama Biochemical Co., Ltd., δ-tocopherol content: 86%) were mixed, and the mixture was added as an oil phase to the polyhydric alcohol mixture. The mixture was emulsified with a homomixer (manufactured by Tokushu Kika Kogyo Co., Ltd.) at a rotational speed of 7000 rpm, to give a yuzu orange emulsion flavor of the inventive product 23.

Comparative Example 1-22

As a polyhydric alcohol mixture, 3 g of pentaglycerol monopalmitate (manufactured by Taiyo Kagaku Co., Ltd., HLB value: 13, pentaglycerol content in polyglycerol composition: 45%), which is a polyglycerol fatty acid ester, was added to 94 g of glycerol (manufactured by NOF Corporation), and the mixture was dissolved by heating the mixture to 65° C. Three grams of yuzu orange essential oil (manufactured by Soda Aromatic Co., Ltd.) was added as an oil phase to the polyhydric alcohol mixture, and the mixture was emulsified with a homomixer (manufactured by Tokushu Kika Kogyo Co., Ltd.) at a rotational speed of 7000 rpm, to give a yuzu orange emulsion flavor of the comparative product 50.

Comparative Example 1-23

As a polyhydric alcohol mixture, 3 g of pentaglycerol monopalmitate (manufactured by Taiyo Kagaku Co., Ltd., HLB value: 13, pentaglycerol content in polyglycerol composition: 45%), which is a polyglycerol fatty acid ester, and 6 g of ferulic acid (ferulic acid content: 98% or more, manufactured by Tsuno Food Industrial Co., Ltd.) were added to 88 g of glycerol (manufactured by NOF Corporation), and the mixture was dissolved by heating the mixture to 65° C. Three grams of yuzu orange essential oil (manufactured by Soda Aromatic Co., Ltd.) was added as an oil phase to the polyhydric alcohol mixture, and the mixture was emulsified with a homomixer (manufactured by Tokushu Kika Kogyo Co., Ltd.) at a rotational speed of 7000 rpm, to give a yuzu orange emulsion flavor of the comparative product 51.

Comparative Example 1-24

As a polyhydric alcohol mixture, 3 g of pentaglycerol monopalmitate (manufactured by Taiyo Kagaku Co., Ltd., HLB value: 13, pentaglycerol content in polyglycerol composition: 45%), which is a polyglycerol fatty acid ester, was added to 88 g of glycerol (manufactured by NOF Corporation), and the mixture was dissolved by heating the mixture to 65° C. Three grams of yuzu orange essential oil (manufactured by Soda Aromatic Co., Ltd.) and 6 g of extracted tocopherol (manufactured by Tama Biochemical Co., Ltd., δ-tocopherol content: 86%) were mixed, and the mixture was added as an oil phase to the polyhydric alcohol mixture. The mixture was emulsified with a homomixer (manufactured by Tokushu Kika Kogyo Co., Ltd.) at a rotational speed of 7000 rpm, to give a yuzu orange emulsion flavor of the comparative product 52.

Comparative Example 1-25

As a polyhydric alcohol mixture, 3 g of pentaglycerol monopalmitate (manufactured by Taiyo Kagaku Co., Ltd., HLB value: 13, pentaglycerol content in polyglycerol composition: 45%), which is a polyglycerol fatty acid ester, and 6 g of a green tea extract (trade name: SUNPHENON BG, catechin content: 70%, manufactured by Taiyo Kagaku Co., Ltd.) were added to 88 g of glycerol (manufactured by NOF Corporation), and the mixture was dissolved by heating the mixture to 65° C. Three grams of yuzu orange essential oil (manufactured by Soda Aromatic Co., Ltd.) was added as an oil phase to the polyhydric alcohol mixture, and the mixture was emulsified with a homomixer (manufactured by Tokushu Kika Kogyo Co., Ltd.) at a rotational speed of 7000 rpm, to give a yuzu orange emulsion flavor of the comparative product 53.

Comparative Example 1-26

As a polyhydric alcohol mixture, 3 g of pentaglycerol monostearate (manufactured by Taiyo Kagaku Co., Ltd., HLB value: 13, pentaglycerol content in polyglycerol composition: 45%), which is a polyglycerol fatty acid ester, and 4 g of gallic acid were added to 88 g of glycerol (manufactured by NOF Corporation), and the mixture was dissolved by heating the mixture to 65° C. Three grams of yuzu orange essential oil (manufactured by Soda Aromatic Co., Ltd.) and 2 g of extracted tocopherol (manufactured by Tama Biochemical Co., Ltd., δ-tocopherol content: 86%) were mixed, and the mixture was added as an oil phase to the polyhydric alcohol mixture. The mixture was emulsified with a homomixer (manufactured by Tokushu Kika Kogyo Co., Ltd.) at a rotational speed of 7000 rpm, to give a yuzu orange emulsion flavor of the comparative product 54.

Comparative Example 1-27

As a polyhydric alcohol mixture, 3 g of pentaglycerol monostearate (manufactured by Taiyo Kagaku Co., Ltd., HLB value: 13, pentaglycerol content in polyglycerol composition: 45%), which is a polyglycerol fatty acid ester, and 4 g of sodium ascorbate were added to 88 g of glycerol (manufactured by NOF Corporation), and the mixture was dissolved by heating the mixture to 65° C. Three grams of yuzu orange essential oil (manufactured by Soda Aromatic Co., Ltd.) and 2 g of extracted tocopherol (manufactured by Tama Biochemical Co., Ltd., δ-tocopherol content: 86%) were mixed, and the mixture was added as an oil phase to the polyhydric alcohol mixture. The mixture was emulsified with a homomixer (manufactured by Tokushu Kika Kogyo Co., Ltd.) at a rotational speed of 7000 rpm, to give a yuzu orange emulsion flavor of the comparative product 55.

Example 1-16

Eighty milliliters of commercially available seasoning soy sauce (salt concentration=10%) and 120 ml of grain vinegar (pure-rice vinegar) were mixed, to give a base of non-oil Japanese style dressing. The inventive product 22 or 23 obtained in Example 1-14 or 1-15 was added thereto in an amount of 0.1%, and the mixture was then poured into each of 100 ml plastic bottles, to give Japanese style dressings of the inventive products 24 and 25. Furthermore, each of the comparative products 50 to 55 obtained in Comparative Examples 1-22 to 1-27 was added in an amount of 0.1% instead of adding the inventive product 22 or 23 in an amount of 0.1%, to give yuzu orange Japanese style dressings of the comparative products 56 to 61.

Test Example 1-7

Each of the Japanese style yuzu orange dressings obtained in Example 1-16 was stored (at 10° C.) under irradiation with a fluorescent lamp of 1500 luxes for 2 months. Thereafter, the sensory evaluation was made on the extent of flavor deterioration thereof against a sample stored in a refrigerator (light shielded) of 5° C. used as a standard by 10 well trained panelists. The evaluation was rated on the basis of the same criteria as those of Test Example 1-2. The results are shown in Table 7.

In addition, each of the Japanese style yuzu orange dressings obtained in Example 1-16 was stored at 37° C. for 2 months. Thereafter, the sensory evaluation was made by 10 well trained panelists. The evaluation method was carried out in the same manner as in Test Example 1-2. The results are shown in Table 7.

TABLE 7

|  | 1500 lx, 2 months | 37° C., 2 months |
| --- | --- | --- |
| Inventive Product 24 | 4.3 | 4.4 |
| Inventive Product 25 | 4.5 | 4.7 |
| Comparative Product 56 | 1.0 | 1.1 |
| Comparative Product 57 | 2.3 | 1.5 |
| Comparative Product 58 | 2.4 | 2.8 |
| Comparative Product 59 | 2.2 | 2.3 |
| Comparative Product 60 | 2.0 | 2.4 |
| Comparative Product 61 | 2.1 | 2.5 |

As is clear from Table 7, by the use of the yuzu orange flavor to which the deterioration preventive of the inventive product was added, it was clarified that the deterioration by light and heat was effectively prevented, and that off flavor to be generated was remarkably suppressed, as compared to the comparative products. In addition, the inventive products 24 and 25 showed somewhat changed taste for both under irradiation with 1500 luxes and storage at 37° C. for 2 months, thereby sufficiently exhibiting an effect of preventing deterioration even in a long-term storage.

Example 2-1

As a polyhydric alcohol mixture, 2 g of DK-ester-SS (manufactured by Dai-ichi Kogyo Seiyaku Co., Ltd., HLB value: 19, monoester content: 95%), which is a sucrose fatty acid ester, and 2 g of ferulic acid (ferulic acid content: 98% or more, manufactured by Tsuno Food Industrial Co., Ltd.) were added to 95 g of glycerol (manufactured by NOF Corporation), and the mixture was dissolved by heating the mixture to 65° C. One gram of extracted tocopherol (manufactured by Tama Biochemical Co., Ltd., d-δ-tocopherol content: 86%) was added as an oil phase to the polyhydric alcohol mixture, and the mixture was emulsified with a homomixer (manufactured by Tokushu Kika Kogyo Co., Ltd.) at a rotational speed of 7000 rpm, to give a deterioration preventive.

Example 2-2

As a polyhydric alcohol mixture, 2 g of DK-ester-SS (manufactured by Dai-ichi Kogyo Seiyaku Co., Ltd., HLB value: 19, monoester content: 95%), which is a sucrose fatty acid ester, 1 g of ferulic acid (ferulic acid content: 98% or more, manufactured by Tsuno Food Industrial Co., Ltd.) and 1 g of a green tea extract (trade name: SUNPHENON BG, catechin content: 70%, manufactured by Taiyo Kagaku Co., Ltd.) were added to 95 g of glycerol (manufactured by NOF Corporation), and the mixture was dissolved by heating the mixture to 65° C. One gram of extracted tocopherol (manufactured by Tama Biochemical Co., Ltd., δ-tocopherol content: 86%) was added as an oil phase to the polyhydric alcohol mixture, and the mixture was emulsified with a homomixer (manufactured by Tokushu Kika Kogyo Co., Ltd.) at a rotational speed of 7000 rpm, to give a deterioration preventive.

Example 2-3

As a polyhydric alcohol mixture, 2 g of RHEODOL TW-L120 (polyoxyethylene palm oil fatty acid sorbitan (ethylene oxide(20 moles) adduct), manufactured by Kao Corporation, HLB value: 16.7), which is a fatty acid polyoxyethylene sorbitan, 1 g of ferulic acid (ferulic acid content: 98% or more, manufactured by Tsuno Food Industrial Co., Ltd.) and 1 g of a green tea extract (trade name: SUNPHENON BG, catechin content: 70%, manufactured by Taiyo Kagaku Co., Ltd.) were added to 95 g of glycerol (manufactured by NOF Corporation), and the mixture was dissolved by heating the mixture to 65° C. One gram of extracted tocopherol (manufactured by Tama Biochemical Co., Ltd., δ-tocopherol content: 86%) was added as an oil phase to the polyhydric alcohol mixture, and the mixture was emulsified with a homomixer (manufactured by Tokushu Kika Kogyo Co., Ltd.) at a rotational speed of 7000 rpm, to give a deterioration preventive.

Example 2-4

As a polyhydric alcohol mixture, 2 g of RHEODOL TW-0120 (polyoxyethylene sorbitan monooleate (ethylene oxide (20 moles) adduct), manufactured by Kao Corporation, HLB value: 15.0), which is a fatty acid polyoxyethylene sorbitan, 1 g of ferulic acid (ferulic acid content: 98% or more, manufactured by Tsuno Food Industrial Co., Ltd.) and 1 g of a green tea extract (trade name: SUNPHENON BG, catechin content: 70%, manufactured by Taiyo Kagaku Co., Ltd.) were added to 95 g of glycerol (manufactured by NOF Corporation), and the mixture was dissolved by heating the mixture to 65° C. One gram of extracted tocopherol (manufactured by Tama Biochemical Co., Ltd., δ-tocopherol content: 86%) was added as an oil phase to the polyhydric alcohol mixture, and the mixture was emulsified with a homomixer (manufactured by Tokushu Kika Kogyo Co., Ltd.) at a rotational speed of 7000 rpm, to give a deterioration preventive.

Comparative Example 2-1

As a polyhydric alcohol mixture, 2 g of soybean lecithin (manufactured by Taiyo Kagaku Co., Ltd., HLB value: 7) and 2 g of ferulic acid (ferulic acid content: 98% or more, manufactured by Tsuno Food Industrial Co., Ltd.) were added to 95 g of glycerol (manufactured by NOF Corporation), and the mixture was dissolved by heating the mixture to 65° C. One gram of extracted tocopherol (manufactured by Tama Biochemical Co., Ltd., δ-tocopherol content: 86%) was added as an oil phase to the polyhydric alcohol mixture, and the mixture was emulsified with a homomixer (manufactured by Tokushu Kika Kogyo Co., Ltd.) at a rotational speed of 7000 rpm, to give a deterioration preventive.

Comparative Example 2-2

As a polyhydric alcohol mixture, 2 g of glycerol monostearate citrate (manufactured by Taiyo Kagaku Co., Ltd., HLB value: 8.0), which is an organic acid monoglyceride, 1 g of ferulic acid (ferulic acid content: 98% or more, manufactured by Tsuno Food Industrial Co., Ltd.) and 1 g of a green tea extract (trade name: SUNPHENON BG, catechin content: 70%, manufactured by Taiyo Kagaku Co., Ltd.) were added to 95 g of glycerol (manufactured by NOF Corporation), and the mixture was dissolved by heating the mixture to 65° C. One gram of extracted tocopherol (manufactured by Tama Biochemical Co., Ltd., δ-tocopherol content: 86%) was added as an oil phase to the polyhydric alcohol mixture, and the mixture was emulsified with a homomixer (manufactured by Tokushu Kika Kogyo Co., Ltd.) at a rotational speed of 7000 rpm, to give a deterioration preventive.

Comparative Example 2-3

As a polyhydric alcohol mixture, 2 g of gum arabic (manufactured by Sankyo Foods Industry Corp.), 1 g of ferulic acid (ferulic acid content: 98% or more, manufactured by Tsuno Food Industrial Co., Ltd.) and 1 g of a green tea extract (trade name: SUNPHENON BG, catechin content: 70%, manufactured by Taiyo Kagaku Co., Ltd.) were added to 95 g of glycerol (manufactured by NOF Corporation), and the mixture was dissolved by heating the mixture to 65° C. One gram of extracted tocopherol (manufactured by Tama Biochemical Co., Ltd., δ-tocopherol content: 86%) was added as an oil phase to the polyhydric alcohol mixture, and the mixture was emulsified with a homomixer (manufactured by Tokushu Kika Kogyo Co., Ltd.) at a rotational speed of 7000 rpm, to give a deterioration preventive.

Test Example 2-1

High fructose corn syrup 10%, citric acid 0.25% and sodium citrate 0.05% were dissolved in water 90% to prepare an acidic sugar solution having a Bx. 7.5 and a pH 2.8. Each of the deterioration preventives obtained in Examples 2-1 to 2-4 and Comparative Examples 2-1 to 2-3 were added to this acidic sugar solution in an amount of 0.1%, and the mixture was thermally sterilized at 93° C. Thereafter, the mixture was hot-packed in a colorless, transparent glass bottle. The mixture was cooled to give an acidic sugar solution containing the deterioration preventive. The turbidity of each of the acidic sugar solutions containing a deterioration preventive was determined in terms of an absorption luminosity at a wavelength of 650 nm with a spectrophotometer, and the state was visually confirmed. In addition, the average particle size thereof was determined with a particle size distribution analyzer (manufactured by Beckmann Coulter: L-230). Further, the acidic sugar solution was stored at 55° C. for 2 weeks, and the turbidity and the average particle size after storage were determined in the same manner, and the state was visually confirmed. The results are shown in Table 8.

TABLE 8

| | Immediately After Preparation | | After Storage at 55° C. for 2 weeks | |
|---|---|---|---|---|
| | Turbidity (Visually Observed) | Average Particle Size (μm) | Turbidity (Visually Observed) | Average Particle Size (μm) |
| Example 2-1 | 0.0035 (transparent) | 0.078 | 0.0033 (transparent) | 0.082 |
| Example 2-2 | 0.0049 (transparent) | 0.091 | 0.0044 (transparent) | 0.086 |
| Example 2-3 | 0.0207 (translucent) | 0.525 | 0.0310 (translucent) | 0.529 |
| Example 2-4 | 0.0533 (translucent) | 0.683 | 0.0495 (translucent) | 0.701 |
| Comparative Example 2-1 | 1.0236 (white turbid) | 23.55 | Separated, Incapable Measurement | Separated, Incapable Measurement |
| Comparative Example 2-2 | 1.3299 (white turbid) | 45.78 | Separated, Incapable Measurement | Separated, Incapable Measurement |
| Comparative Example 2-3 | 1.0781 (white turbid) | 1.547 | 2.846 (white turbid, formation of white separate layer in upper portion) | 3.827 |

As is clear from Table 8, the inventive products had an emulsion particle size of 1 μm or less and showed no separation or the like even after storage at 55° C. for 2 weeks, thereby being stable, as compared to the comparative products.

Example 2-5

As a polyhydric alcohol mixture, 2 g of DK-ester-SS (manufactured by Dai-ichi Kogyo Seiyaku Co., Ltd., HLB value: 19, monoester content: 95%), which is a sucrose fatty acid ester, 1 g of ferulic acid (ferulic acid content: 98% or more, manufactured by Tsuno Food Industrial Co., Ltd.) and 1 g of a green tea extract (trade name: SUNPHENON BG, catechin content: 70%, manufactured by Taiyo Kagaku Co., Ltd.) were added to 95 g of glycerol (manufactured by NOF Corporation), and the mixture was dissolved by heating the mixture to 65° C. One gram of extracted tocopherol (Riken E-Oil Super 80, manufactured by Riken Vitamin Co., Ltd., δ-tocopherol content: 46%) was added as an oil phase to the polyhydric alcohol mixture, and the mixture was emulsified with a homomixer (manufactured by Tokushu Kika Kogyo Co., Ltd.) at a rotational speed of 7000 rpm, to give a deterioration preventive.

Comparative Example 2-4

As a polyhydric alcohol mixture, 2 g of DK-ester-SS (manufactured by Dai-ichi Kogyo Seiyaku Co., Ltd., HLB value: 19, monoester content: 95%), which is a sucrose fatty acid ester, and 3 g of a green tea extract (trade name: SUNPHENON BG, catechin content: 70%, manufactured by Taiyo Kagaku Co., Ltd.) were added to 95 g of glycerol (manufactured by NOF Corporation), and the mixture was dissolved by heating the mixture to 65° C., to give a deterioration preventive.

Comparative Example 2-5

As a polyhydric alcohol mixture, 2 g of DK-ester-SS (manufactured by Dai-ichi Kogyo Seiyaku Co., Ltd., HLB value: 19, monoester content: 95%), which is a sucrose fatty acid ester, 2 g of ferulic acid (ferulic acid content: 98% or more, manufactured by Tsuno Food Industrial Co., Ltd.) and 1 g of a green tea extract (trade name: SUNPHENON BG, catechin content: 70%, manufactured by Taiyo Kagaku Co., Ltd.) were added to 95 g of glycerol (manufactured by NOF Corporation), and the mixture was dissolved by heating the mixture to 65° C., to give a deterioration preventive.

Comparative Example 2-6

As a polyhydric alcohol mixture, 2 g of DK-ester-SS (manufactured by Dai-ichi Kogyo Seiyaku Co., Ltd., HLB value: 19, monoester content: 95%), which is a sucrose fatty acid ester, 1 g of ferulic acid (ferulic acid content: 98% or more, manufactured by Tsuno Food Industrial Co., Ltd.) and 1 g of a green tea extract (trade name: SUNPHENON BG, catechin content: 70%, manufactured by Taiyo Kagaku Co., Ltd.) were added to 95 g of glycerol (manufactured by NOF Corporation), and the mixture was dissolved by heating the mixture to 65° C. One gram of extracted tocopherol (Riken E-Oil 800, manufactured by Riken Vitamin Co., Ltd., δ-tocopherol content: 27%) was added as an oil phase to the polyhydric alcohol mixture, and the mixture was emulsified with a homomixer (manufactured by Tokushu Kika Kogyo Co., Ltd.) at a rotational speed of 7000 rpm, to give a deterioration preventive.

Test Example 2-2

Granulated sugar 10%, citric acid 0.15%, sodium citrate 0.02% and lemon essence 0.1% were dissolved in water 90% to prepare a lemon beverage base having a Bx. 7.5 and a pH 3. Each of the deterioration preventives obtained in Examples 2-1, 2-2 and 2-5 and Comparative Examples 2-4, 2-5 and 2-6 was added to this lemon beverage base in an amount of 0.1%, and the mixture was thermally sterilized at 93° C. Thereafter, the mixture was hot-packed in a colorless, transparent PET bottle. The mixture was cooled to give a lemon beverage. The lemon beverage was allowed to stand for 8 hours under direct sun light (average temperature: 23° C.). Thereafter, the sensory evaluation on the extent of flavor deterioration thereof against a sample stored in a refrigerator (light shielded) at 5° C. used as a standard by 10 well trained panelists. The results are shown in Table 9. The score for evaluation in Table 9 is an average score of the panelists rated on the basis of the following criteria.

(Evaluation Criteria)

Equivalent to the refrigerator-stored sample (no change): Score 5

Slightly changed from that compared to the refrigerator-stored sample: Score 4

Somewhat changed from that compared to the refrigerator-stored sample: Score 3

Fairly changed from that compared to the refrigerator-stored sample: Score 2

Remarkably changed from that compared to the refrigerator-stored sample: Score 1

The amount of citral, a flavor component distinctive to citruses such as lemon was determined by high-performance liquid chromatography (HPLC), and the extent of flavor deterioration was evaluated in terms of the residual ratio thereof. The higher the residual ratio of citral, the smaller the deterioration of flavor. The results are shown in Table 9 together with the results of the sensory test. The determination conditions for the amount of citral are as follows.

(Determination Conditions)

Apparatus: CLASS-LC10 (manufactured by Shimadzu Corporation)

Column: CAPCELL PAK C18 UG120 (SHISEIDO)

Eluent: 60% methanol/water

Flow rate: 1 ml/min

Detected wavelength: UV 240 nm

The residual ratio (%) of citral was calculated according to the following formula, wherein.

the amount of citral of refrigerator-stored sample: A
the amount of citral of light-irradiated sample: B $(B/A) \times 100 =$ Residual Ratio (%) of Citral

TABLE 9

|  | Sensory Evaluation | Residual Ratio of Citral (%) |
| --- | --- | --- |
| Example 2-1 | 4.5 | 90 |
| Example 2-2 | 4.8 | 95 |
| Example 2-5 | 4.4 | 85 |
| Comparative Example 2-4 | 1.3 | 28 |
| Comparative Example 2-5 | 2.5 | 43 |
| Comparative Example 2-6 | 3 | 58 |

As is clear from these results, the inventive products effectively prevented flavor deterioration by light as compared to the comparative products. In addition, the inventive products showed higher residual ratios of citral, a flavor component of lemon, thereby effectively maintaining fresh flavor of lemon, as compared to the comparative products.

Example 2-6

As a polyhydric alcohol mixture, 4 g of RHEODOL TW-0120 (polyoxyethylene sorbitan monooleate (ethylene oxide (20 moles) adduct), manufactured by Kao Corporation, HLB value: 15.0), which is a fatty acid polyoxyethylene sorbitan, 2 g of ferulic acid (ferulic acid content: 98% or more, manufactured by Tsuno Food Industrial Co., Ltd.) and 1 g of a green tea extract (trade name: SUNPHENON BG, catechin content: 70%, manufactured by Taiyo Kagaku Co., Ltd.) were added to 89 g of glycerol (manufactured by NOF Corporation), and the mixture was dissolved by heating the mixture to 65° C. Three grams of extracted tocopherol (manufactured by Tama Biochemical Co., Ltd., δ-tocopherol content: 86%) and 1 g of milk oil-based flavor (manufactured by International Flavors & Fragrances (Japan) Ltd.) were added as an oil phase to the polyhydric alcohol mixture, and the mixture was emulsified with a homomixer (manufactured by Tokushu Kika Kogyo Co., Ltd.) at a rotational speed of 7000 rpm, to give a milk emulsion flavor containing a deterioration preventive.

Example 2-7

As a polyhydric alcohol mixture, 4 g of RHEODOL TW-O120 (polyoxyethylene sorbitan monooleate (ethylene oxide (20 moles) adduct), manufactured by Kao Corporation, HLB value: 15.0), which is a fatty acid polyoxyethylene sorbitan, 2 g of ferulic acid (ferulic acid content: 98% or more, manufactured by Tsuno Food Industrial Co., Ltd.) and 1 g of a green tea extract (trade name: SUNPHENON BG, catechin content: 70%, manufactured by Taiyo Kagaku Co., Ltd.) were added to 89 g of sorbitol (manufactured by Towa Chemical Industry Co., Ltd.), and the mixture was dissolved by heating the mixture to 65° C. Three grams of extracted tocopherol (manufactured by Tama Biochemical Co., Ltd., δ-tocopherol content: 86%) and 1 g of milk oil-based flavor (manufactured by International Flavors & Fragrances (Japan) Ltd.) were added as an oil phase to the polyhydric alcohol mixture, and the mixture was emulsified with a homomixer (manufactured by Tokushu Kika Kogyo Co., Ltd.) at a rotational speed of 7000 rpm, to give a milk emulsion flavor containing a deterioration preventive.

Comparative Example 2-7

As a polyhydric alcohol mixture, 4 g of RHEODOL TW-0120 (polyoxyethylene sorbitan monooleate (ethylene oxide (20 moles) adduct), manufactured by Kao Corporation, HLB value: 15.0), which is a fatty acid polyoxyethylene sorbitan, 4 g of enzyme-treated rutin (manufactured by Kiriya Chemical Co. Ltd., enzyme-treated rutin: 50%) and 1 g of a green tea extract (trade name: SUNPHENON BG, catechin content: 70%, manufactured by Taiyo Kagaku Co., Ltd.) were added to 87 g of sorbitol (manufactured by Towa Chemical Industry Co., Ltd.), and the mixture was dissolved by heating the mixture to 65° C. Three grams of extracted tocopherol (manufactured by Tama Biochemical Co., Ltd., δ-tocopherol content: 86%) and 1 g of milk oil-based flavor (manufactured by International Flavors & Fragrances (Japan) Ltd.) were added as an oil phase to the polyhydric alcohol mixture, and the mixture was emulsified with a homomixer (manufactured by Tokushu Kika Kogyo Co., Ltd.) at a rotational speed of 7000 rpm, to give a milk emulsion flavor containing a deterioration preventive.

Comparative Example 2-8

As a polyhydric alcohol mixture, 4 g of RHEODOL TW-O120 (polyoxyethylene sorbitan monooleate (ethylene oxide (20 moles) adduct), manufactured by Kao Corporation, HLB value: 15.0), which is a fatty acid polyoxyethylene sorbitan, 10 g of a myrica extract (manufactured by San-Ei Gen F.F.I., Inc., myrica extract: 20%) and 1 g of a green tea extract (trade name: SUNPHENON BG, catechin content: 70%, manufactured by Taiyo Kagaku Co., Ltd.) were added to 81 g of sorbitol (manufactured by Towa Chemical Industry Co., Ltd.), and the mixture was dissolved by heating the mixture to 65° C. Three grams of extracted tocopherol (manufactured by Tama Biochemical Co., Ltd., δ-tocopherol content: 86%) and 1 g of milk oil-based flavor (manufactured by International Flavors & Fragrances (Japan) Ltd.) were added as an oil phase to the polyhydric alcohol mixture, and the mixture was emulsified with a homomixer (manufactured by Tokushu Kika Kogyo Co., Ltd.) at a rotational speed of 7000 rpm, to give a milk emulsion flavor containing a deterioration preventive.

Comparative Example 2-9

As a polyhydric alcohol mixture, 4 g of RHEODOL TW-O120 (polyoxyethylene sorbitan monooleate (ethylene oxide (20 moles) adduct), manufactured by Kao Corporation, HLB value: 15.0), which is a fatty acid polyoxyethylene sorbitan, 4 g of a rosemary extract (manufactured by Mitsubishi Chemical Corporation, rosemary extract content: 45%) and 1 g of a green tea extract (trade name: SUNPHENON BG, catechin content: 70%, manufactured by Taiyo Kagaku Co., Ltd.) were added to 87 g of sorbitol (manufactured by Towa Chemical Industry Co., Ltd.), and the mixture was dissolved by heating the mixture to 65° C. Three grams of extracted tocopherol (manufactured by Tama Biochemical Co., Ltd., δ-tocopherol content: 86%) and 1 g of milk oil-based flavor (manufactured by International Flavors & Fragrances (Japan) Ltd.) were added as an oil phase to the polyhydric alcohol mixture, and the mixture was emulsified with a homomixer (manufactured by Tokushu Kika Kogyo Co., Ltd.) at a rotational speed of 7000 rpm, to give a milk emulsion flavor containing a deterioration preventive.

Test Example 2-3

Ninety-five grams of milk and 5 g of skim milk powder were mixed, and the mixture was sterilized (90° C., 15 minutes) and cooled (30° to 45° C.), and then inoculated with a starter. The mixture was fermented to a pH 4.3, and then cooled to give a yoghurt base. On the other hand, 16 g of sugar, 1.2 g of pectin and 82.8 g of water were mixed, and thereafter the mixture was sterilized (95° C., 5 minutes), to give a syrup solution. The above-mentioned yoghurt base and syrup liquid were mixed at a ratio of 1:1, and thereto was added each of the milk emulsion flavors of Examples 2-6 and 2-7 and Comparative Examples 2-7, 2-8 and 2-9 in an amount of 0.1%, and the mixture was homogenized with a homomixer and a homogenizer (150 kg/cm2) under sterile condition. A semi-transparent plastic vessel (120 ml) was filled with each of the mixtures, to give a yoghurt beverage.

Each of the yoghurt beverages was stored under irradiation with a fluorescent lamp of 2000 luxes for 2 months (5° C.), and the sensory evaluation was made on the extent of flavor deterioration thereof against a sample stored in a refrigerator (light shielded) at 5° C. used as a standard by 10 well trained panelists. The evaluation was rated on the basis of the same criteria as those in Test Example 2-2. The results are shown in Table 10.

TABLE 10

|  | 2000 lx, 2 weeks |
| --- | --- |
| Example 2-6 | 4.8 |
| Example 2-7 | 4.7 |
| Comparative Example 2-7 | 2.9 |
| Comparative Example 2-8 | 2.5 |
| Comparative Example 2-9 | 2.4 |

As is clear from Table 10, by use of the milk flavor to which the deterioration preventive of the inventive product was added, the deterioration by light was effectively prevented, thereby remarkably suppressing off flavor to be generated.

Example 3-1

As a polyhydric alcohol mixture, 3 g of pentaglycerol monomyristate (manufactured by Taiyo Kagaku Co., Ltd., HLB value: 13, pentaglycerol content in polyglycerol composition: 45%), which is a polyglycerol fatty acid ester, and 1 g of a green tea extract (trade name: SUNPHENON BG, catechin content: 70%, manufactured by Taiyo Kagaku Co., Ltd.) as a catechin were added to 90 g of hydrogenated starch hydrolysate (manufactured by Towa Chemical Industry Co., Ltd.), and the mixture was dissolved by heating the mixture to 60° C. Five grams of coffee oil-based flavor (manufactured by International Flavors & Fragrances (Japan) Ltd.) and 1 g of extracted tocopherol (manufactured by Tama Biochemical Co., Ltd., δ-tocopherol content: 86%) were mixed, and the mixture was added as an oil phase to the polyhydric alcohol mixture. The mixture was emulsified with a homomixer (manufactured by Tokushu Kika Kogyo Co., Ltd.) at a rotational speed of 6000 rpm, to give a coffee emulsion flavor of the inventive product 1'.

Comparative Example 3-1

As a polyhydric alcohol mixture, 3 g of pentaglycerol monomyristate (manufactured by Taiyo Kagaku Co., Ltd., HLB value: 13, pentaglycerol content in polyglycerol composition: 45%), which is a polyglycerol fatty acid ester, was added to 92 g of hydrogenated starch hydrolysate (manufactured by Towa Chemical Industry Co., Ltd.), and the mixture was dissolved by heating the mixture to 60° C. Five grams of coffee oil-based flavor (manufactured by International Flavors & Fragrances (Japan) Ltd.) was added to the polyhydric alcohol mixture, and the mixture was emulsified with a homomixer (manufactured by Tokushu Kika Kogyo Co., Ltd.) at a rotational speed of 6000 rpm, to give a coffee emulsion flavor of the comparative product 1'.

Comparative Example 3-2

As a polyhydric alcohol mixture, 3 g of pentaglycerol monomyristate (manufactured by Taiyo Kagaku Co., Ltd., HLB value: 13, pentaglycerol content in polyglycerol composition: 45%), which is a polyglycerol fatty acid ester, was added to 90 g of hydrogenated starch hydrolysate (manufactured by Towa Chemical Industry Co., Ltd.), and the mixture was dissolved by heating the mixture to 60° C. Five grams of coffee oil-based flavor (manufactured by International Flavors & Fragrances (Japan) Ltd.) and 2 g of extracted tocopherol (manufactured by Tama Biochemical Co., Ltd., δ-tocopherol content: 86%) were mixed, and the mixture was added as an oil phase to the polyhydric alcohol mixture. The mixture was emulsified with a homomixer (manufactured by Tokushu Kika Kogyo Co., Ltd.) at a rotational speed of 6000 rpm, to give a coffee emulsion flavor of the comparative product 2'.

Comparative Example 3-3

As a polyhydric alcohol mixture, 3 g of pentaglycerol monomyristate (manufactured by Taiyo Kagaku Co., Ltd., HLB value: 13, pentaglycerol content in polyglycerol composition: 45%), which is a polyglycerol fatty acid ester, and 2 g of a green tea extract (trade name: SUNPHENON BG, catechin content: 70%, manufactured by Taiyo Kagaku Co., Ltd.) as a catechin were added to 90 g of hydrogenated starch hydrolysate (manufactured by Towa Chemical Industry Co., Ltd.), and the mixture was dissolved by heating the mixture to 60° C. Five grams of coffee oil-based flavor (manufactured by International Flavors & Fragrances (Japan) Ltd.) was added to the polyhydric alcohol mixture, and the mixture was emulsified with a homomixer (manufactured by Tokushu Kika Kogyo Co., Ltd.) at a rotational speed of 6000 rpm, to give a coffee emulsion flavor of the comparative product 3'.

Comparative Example 3-4

As a polyhydric alcohol mixture, 3 g of pentaglycerol monomyristate (manufactured by Taiyo Kagaku Co., Ltd., HLB value: 13, pentaglycerol content in polyglycerol composition: 45%), which is a polyglycerol fatty acid ester, and 2 g of enzyme-treated rutin (manufactured by Kiriya Chemical Co. Ltd., enzyme-treated rutin: 50%) were added to 90 g of hydrogenated starch hydrolysate (manufactured by Towa Chemical Industry Co., Ltd.), and the mixture was dissolved by heating the mixture to 60° C. Five grams of coffee oil-based flavor (manufactured by International Flavors & Fragrances (Japan) Ltd.) was added as an oil phase to the polyhydric alcohol mixture, and the mixture was emulsified with a homomixer (manufactured by Tokushu Kika Kogyo Co., Ltd.) at a rotational speed of 6000 rpm, to give a coffee emulsion flavor of the comparative product 4'.

Test Example 3-1

Each of the coffee emulsion flavors obtained in Example and Comparative Examples was stored at 37° C. for 2 months. Thereafter, the sensory evaluation was made in five ranks on the extent of flavor deterioration thereof against a sample stored in a refrigerator at 4° C. used as a standard by 10 well trained panelists. The results are shown in Table 11. The score for evaluation is shown as an average score of 10 panelists.

TABLE 11

|  | Coffee Bean Flavor | Off Flavor |
| --- | --- | --- |
| Inventive Product 1' | 4.5 | 4.8 |
| Comparative Product 1' | 1.3 | 1.2 |
| Comparative Product 2' | 2.1 | 2.0 |
| Comparative Product 3' | 2.8 | 2.7 |
| Comparative Product 4' | 2.3 | 2.2 |

Score for Evaluation

| | |
|---|---|
| 5 | Equivalent to the refrigerator-stored sample (no change). |
| 4 | Slightly changed from that compared to the refrigerator-stored sample. |
| 3 | Somewhat changed from that compared to the refrigerator-stored sample. |
| 2 | Fairly changed from that compared to the refrigerator-stored sample. |
| 1 | Remarkably changed from that compared to the refrigerator-stored sample. |

As is clear from Table 11, the inventive products effectively prevented flavor deterioration during storage, thereby remarkably suppressing the generation of off flavor, as compared to the comparative products.

Example 3-2

As a polyhydric alcohol mixture, 3 g of pentaglycerol monomyristate (manufactured by Taiyo Kagaku Co., Ltd., HLB value: 13, pentaglycerol content in polyglycerol composition: 45%), which is a polyglycerol fatty acid ester, and 1 g of a green tea extract (trade name: SUNPHENON BG, catechin content: 70%, manufactured by Taiyo Kagaku Co., Ltd.) as a catechin were added to 90 g of glycerol (manufactured by NOF Corporation), and the mixture was dissolved by heating the mixture to 60° C. Five grams of lemon essential oil (manufactured by International Flavors & Fragrances (Japan) Ltd.) and 1 g of extracted tocopherol (manufactured by Tama Biochemical Co., Ltd., δ-tocopherol content: 86%) were mixed, and the mixture was added as an oil phase to the polyhydric alcohol mixture. The mixture was emulsified with a homomixer (manufactured by Tokushu Kika Kogyo Co., Ltd.) at a rotational speed of 6000 rpm, to give a lemon emulsion flavor of the inventive product 2'.

Comparative Example 3-5

As a polyhydric alcohol mixture, 3 g of pentaglycerol monomyristate (manufactured by Taiyo Kagaku Co., Ltd., HLB value: 13, pentaglycerol content in polyglycerol composition: 45%), which is a polyglycerol fatty acid ester, was added to 92 g of glycerol (manufactured by NOF Corporation), and the mixture was dissolved by heating the mixture to 60° C. Five grams of lemon essential oil (manufactured by International Flavors & Fragrances (Japan) Ltd.) was added to the polyhydric alcohol mixture, and the mixture was emulsified with a homomixer (manufactured by Tokushu Kika Kogyo Co., Ltd.) at a rotational speed of 6000 rpm, to give a lemon emulsion flavor of the comparative product 5'.

Comparative Example 3-6

As a polyhydric alcohol mixture, 3 g of pentaglycerol monomyristate (manufactured by Taiyo Kagaku Co., Ltd., HLB value: 13, pentaglycerol content in polyglycerol composition: 45%), which is a polyglycerol fatty acid ester, was added to 90 g of glycerol (manufactured by NOF Corporation), and the mixture was dissolved by heating the mixture to 60° C. Five grams of lemon essential oil (manufactured by International Flavors & Fragrances (Japan) Ltd.) and 2 g of extracted tocopherol (manufactured by Tama Biochemical Co., Ltd., δ-tocopherol content: 86%) were mixed, and the mixture was added as an oil phase to the polyhydric alcohol mixture. The mixture was emulsified with a homomixer (manufactured by Tokushu Kika Kogyo Co., Ltd.) at a rotational speed of 6000 rpm, to give a lemon emulsion flavor of the comparative product 6'.

Comparative Example 3-7

As a polyhydric alcohol mixture, 3 g of pentaglycerol monomyristate (manufactured by Taiyo Kagaku Co., Ltd., HLB value: 13, pentaglycerol content in polyglycerol composition: 45%), which is a polyglycerol fatty acid ester, and 2 g of a green tea extract (trade name: SUNPHENON BG, catechin content: 70%, manufactured by Taiyo Kagaku Co., Ltd.) as a catechin were added to 90 g of glycerol (manufactured by NOF Corporation), and the mixture was dissolved by heating the mixture to 60° C. Five grams of lemon essential oil (manufactured by International Flavors & Fragrances (Japan) Ltd.) was added to the polyhydric alcohol mixture, and the mixture was emulsified with a homomixer (manufactured by Tokushu Kika Kogyo Co., Ltd.) at a rotational speed of 6000 rpm, to give a lemon emulsion flavor of the comparative product 7'.

Comparative Example 3-8

As a polyhydric alcohol mixture, 3 g of pentaglycerol monomyristate (manufactured by Taiyo Kagaku Co., Ltd., HLB value: 13, pentaglycerol content in polyglycerol composition: 45%), which is a polyglycerol fatty acid ester, and 2 g of a green coffee bean extract (manufactured by T. Hasegawa Co., Ltd., chlorogenic acid content: 30%) were added to 90 g of glycerol (manufactured by NOF Corporation), and the mixture was dissolved by heating the mixture to 60° C. Five grams of lemon essential oil (manufactured by International Flavors & Fragrances (Japan) Ltd.) was added as an oil phase to the polyhydric alcohol mixture, and the mixture was emulsified with a homomixer (manufactured by Tokushu Kika Kogyo Co., Ltd.) at a rotational speed of 6000 rpm, to give a lemon emulsion flavor of the comparative product 8'.

Test Example 3-2

The lemon emulsion flavors obtained in Example and Comparative Examples were stored at 37° C. for 2 months. Thereafter, the sensory evaluation was made in five ranks on the extent of flavor deterioration thereof against a sample stored in a refrigerator at 4° C. used as a standard by 10 well trained panelists. The results are shown in Table 12. The score for evaluation is shown as an average score of 10 panelists.

TABLE 12

| | Freshness | Off Flavor |
|---|---|---|
| Inventive Product 2' | 4.5 | 4.6 |
| Comparative Product 5' | 1.2 | 1.1 |
| Comparative Product 6' | 2.3 | 2.1 |
| Comparative Product 7' | 2.8 | 2.9 |
| Comparative Product 8' | 3.0 | 3.2 |

Score for Evaluation

| | |
|---|---|
| 5 | Equivalent to the refrigerator-stored sample (no change). |
| 4 | Slightly changed from that compared to the refrigerator-stored sample. |
| 3 | Somewhat changed from that compared to the refrigerator-stored sample. |
| 2 | Fairly changed from that compared to the refrigerator-stored sample. |
| 1 | Remarkably changed from that compared to the refrigerator-stored sample. |

As is clear from Table 12, the inventive products effectively prevented flavor deterioration during storage, thereby remarkably suppressing the generation of off flavor, as compared to the comparative products.

Example 3-3

As a polyhydric alcohol mixture, 3 g of pentaglycerol monooleate (manufactured by Taiyo Kagaku Co., Ltd., HLB value: 13, pentaglycerol content in polyglycerol composition: 45%), which is a polyglycerol fatty acid ester, and 1 g of a green tea extract (trade name: SUNPHENON BG, catechin content: 70%, manufactured by Taiyo Kagaku Co., Ltd.) as a catechin were added to 90 g of sorbitol (manufactured by Towa Chemical Industry Co., Ltd), and the mixture was dissolved by heating the mixture to 60° C. Five grams of milk oil-based flavor (manufactured by International Flavors & Fragrances (Japan) Ltd.) and 1 g of extracted tocopherol (manufactured by Tama Biochemical Co., Ltd., δ-tocopherol content: 86%) were mixed, and the mixture was added as an oil phase to the polyhydric alcohol mixture. The mixture was emulsified with a homomixer (manufactured by Tokushu Kika Kogyo Co., Ltd.) at a rotational speed of 6000 rpm, to give a milk emulsion flavor of the inventive product 3'.

Comparative Example 3-9

As a polyhydric alcohol mixture, 3 g of pentaglycerol monooleate (manufactured by Taiyo Kagaku Co., Ltd., HLB value: 13, pentaglycerol content in polyglycerol composition: 45%), which is a polyglycerol fatty acid ester, was added to 92 g of sorbitol (manufactured by Towa Chemical Industry Co., Ltd), and the mixture was dissolved by heating the mixture to 60° C. Five grams of milk oil-based flavor (manufactured by International Flavors & Fragrances (Japan) Ltd.) was added to the polyhydric alcohol mixture, and the mixture was emulsified with a homomixer (manufactured by Tokushu Kika Kogyo Co., Ltd.) at a rotational speed of 6000 rpm, to give a milk emulsion flavor of the comparative product 9'.

Comparative Example 3-10

As a polyhydric alcohol mixture, 3 g of pentaglycerol monooleate (manufactured by Taiyo Kagaku Co., Ltd., HLB value: 13, pentaglycerol content in polyglycerol composition: 45%), which is a polyglycerol fatty acid ester, was added to 90 g of sorbitol (manufactured by Towa Chemical Industry Co., Ltd), and the mixture was dissolved by heating the mixture to 60° C. Five grams of milk oil-based flavor (manufactured by International Flavors & Fragrances (Japan) Ltd.) and 2 g of extracted tocopherol (manufactured by Tama Biochemical Co., Ltd., δ-tocopherol content: 86%) were mixed, and the mixture was added as an oil phase to the polyhydric alcohol mixture. The mixture was emulsified with a homomixer (manufactured by Tokushu Kika Kogyo Co., Ltd.) at a rotational speed of 6000 rpm, to give a milk emulsion flavor of the comparative product 10'.

Comparative Example 3-11

As a polyhydric alcohol mixture, 3 g of pentaglycerol monooleate (manufactured by Taiyo Kagaku Co., Ltd., HLB value: 13, pentaglycerol content in polyglycerol composition: 45%), which is a polyglycerol fatty acid ester, and 2 g of a green tea extract (trade name: SUNPHENON BG, catechin content: 70%, manufactured by Taiyo Kagaku Co., Ltd.) as a catechin were added to 90 g of sorbitol (manufactured by Towa Chemical Industry Co., Ltd), and the mixture was dissolved by heating the mixture to 60° C. Five grams of milk oil-based flavor (manufactured by International Flavors & Fragrances (Japan) Ltd.) was added as an oil phase to the polyhydric alcohol mixture, and the mixture was emulsified with a homomixer (manufactured by Tokushu Kika Kogyo Co., Ltd.) at a rotational speed of 6000 rpm, to give a milk emulsion flavor of the comparative product 11'.

Comparative Example 3-12

As a polyhydric alcohol mixture, 3 g of pentaglycerol monomyristate (manufactured by Taiyo Kagaku Co., Ltd., HLB value: 13, pentaglycerol content in polyglycerol composition: 45%), which is a polyglycerol fatty acid ester, and 2 g of a myrica extract (manufactured by San-Ei Gen F.F.I., Inc., myrica extract: 20%) were added to 90 g of sorbitol (manufactured by Towa Chemical Industry Co., Ltd.), and the mixture was dissolved by heating the mixture to 60° C. Five grams of milk oil-based flavor (manufactured by International Flavors & Fragrances (Japan) Ltd.) was added to the polyhydric alcohol mixture, and the mixture was emulsified with a homomixer (manufactured by Tokushu Kika Kogyo Co., Ltd.) at a rotational speed of 6000 rpm, to give a milk emulsion flavor of the comparative product 12'.

Test Example 3-3

The milk emulsion flavors obtained in Example and Comparative Examples were stored at 37° C. for 2 months, Thereafter, the sensory evaluation was made in five ranks on the extent of flavor deterioration thereof against a sample stored in a refrigerator of 4° C. used as a standard by 10 well trained panelists. The results are shown in Table 13. The score for evaluation is shown as an average score of 10 panelists.

TABLE 13

| | Freshness | Off Flavor |
|---|---|---|
| Inventive Product 3' | 4.8 | 4.6 |
| Comparative Product 9' | 1.7 | 1.4 |
| Comparative Product 10' | 2.4 | 2.0 |
| Comparative Product 11' | 2.8 | 2.8 |
| Comparative Product 12' | 2.6 | 2.5 |

Score for Evaluation

| | |
|---|---|
| 5 | Equivalent to the refrigerator-stored sample (no change). |
| 4 | Slightly changed from that compared to the refrigerator-stored sample. |
| 3 | Somewhat changed from that compared to the refrigerator-stored sample. |
| 2 | Fairly changed from that compared to the refrigerator-stored sample. |
| 1 | Remarkably changed from that compared to the refrigerator-stored sample. |

As is clear from Table 13, the inventive products effectively prevented flavor deterioration during storage, thereby remarkably suppressing the generation of off flavor, as compared to the comparative products.

INDUSTRIAL APPLICABILITY

According to the present invention, there is provided a deterioration preventive capable of preventing flavor deterioration during the storage of the foodstuff, and a flavor for the foodstuff, and further having excellent dispersibility in the foodstuff or the flavor for the foodstuff without deteriorating the external appearance and taste of the foodstuff, showing no separation of an oil phase during storage, thereby having excellent emulsification stability. Further, according to the present invention, there is provided a flavor for the foodstuff, showing smaller influence in the deterioration during storage of the flavor and being highly flavorful, and foodstuff.

The invention claimed is:

1. A deterioration preventive for a flavor component, which is an oil-in-water and/or an oil-in-polyhydric alcohol emulsion, comprising an extracted tocopherol, wherein d-δ-tocopherol is contained in an amount of 45% by weight or more of a total tocopherol; ferulic acid and/or a derivative thereof; and a polyglycerol fatty acid ester;
wherein the polyglycerol fatty acid ester comprises 35% by weight or more of at least one member selected from the group consisting of polyglycerol fatty acid esters of which degrees of glycerol condensation are tri, tetra, penta, hexa, hepta, octa, nona and deca.

2. A deterioration preventive for a flavor component, which is an oil-in-water and/or an oil-in-polyhydric alcohol emulsion, comprising:
(A) an extracted tocopherol, wherein d-δ-tocopherol is contained in an amount of 45% by weight or more of the total tocopherol;
(B) ferulic acid and/or a derivative thereof; and
(C) an emulsifying agent having an HLB of 9 or more.

3. The deterioration preventive for a flavor component according to claim 2, wherein the emulsifying agent is a sucrose fatty acid ester and/or a polyoxyethylene derivative.

4. The deterioration preventive for a flavor component according to claim 1 or 2 further comprising a tea extract.

5. The deterioration preventive for a flavor component according to claim 4, wherein the tea extract is at least one member selected from the group consisting of (+)-catechin, (−)-epicatechin, (+)-gallocatechin, (−)-epigallocatechin, (−)-catechin gallate, (−)-epicatechin gallate, (−)-epigallocatechin gallate, and (−)-gallocatechin gallate.

6. The deterioration preventive for a flavor component according to any one of claim 1, 2, or 3, wherein emulsion particles have an average particle size of 1.0 μm or less when dispersed in water.

7. A flavor for foodstuff, comprising the deterioration preventive for a flavor component according to claim 1 or 2.

8. The deterioration preventive for a flavor component according to claim 1, wherein the extracted tocopherol is contained in an amount of from 0.001 to 50% by weight.

9. The deterioration preventive for a flavor component according to claim 2, wherein the extracted tocopherol is contained in an amount of from 0.001 to 50% by weight.

10. The deterioration preventive for a flavor component according to claim 1, wherein the ferulic acid is contained in an amount of from 0.005 to 10% by weight.

11. The deterioration preventive for a flavor component according to claim 2, wherein the ferulic acid is contained in an amount of from 0.005 to 10% by weight.

* * * * *